Jan. 6, 1931.  J. W. LYNCH ET AL  1,788,312
GLASS BLOWING MACHINE
Filed June 4, 1917  14 Sheets-Sheet 5
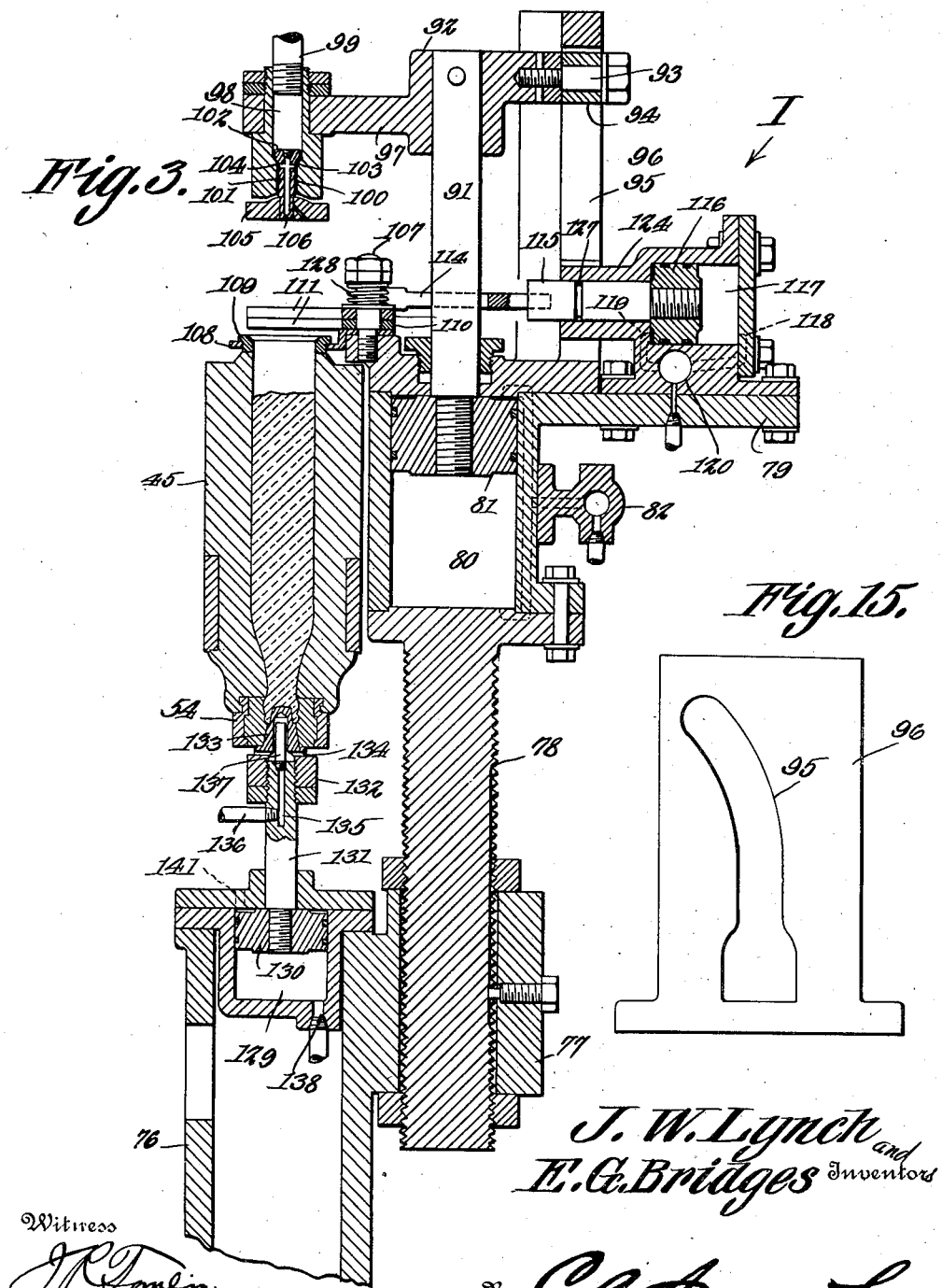

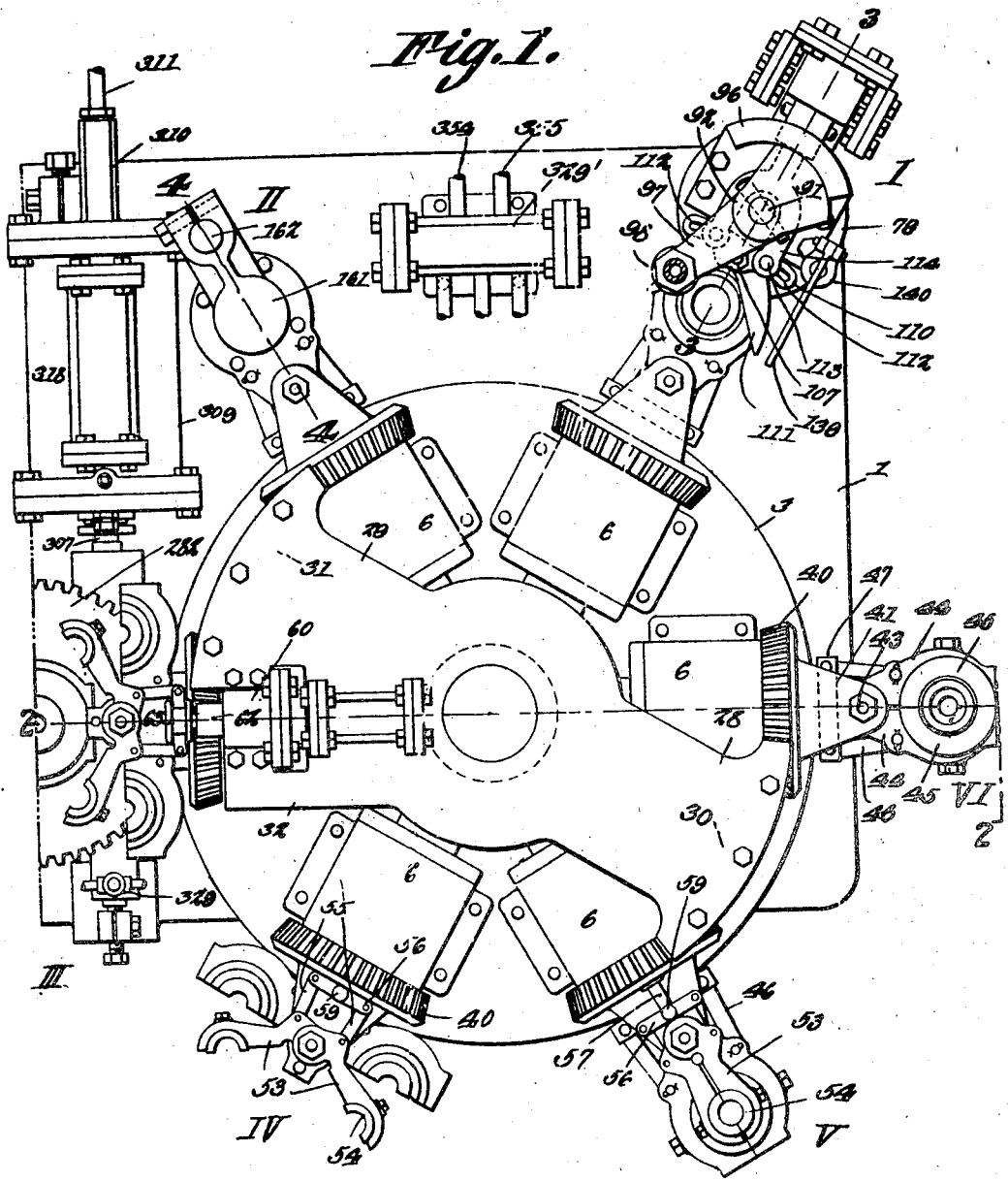

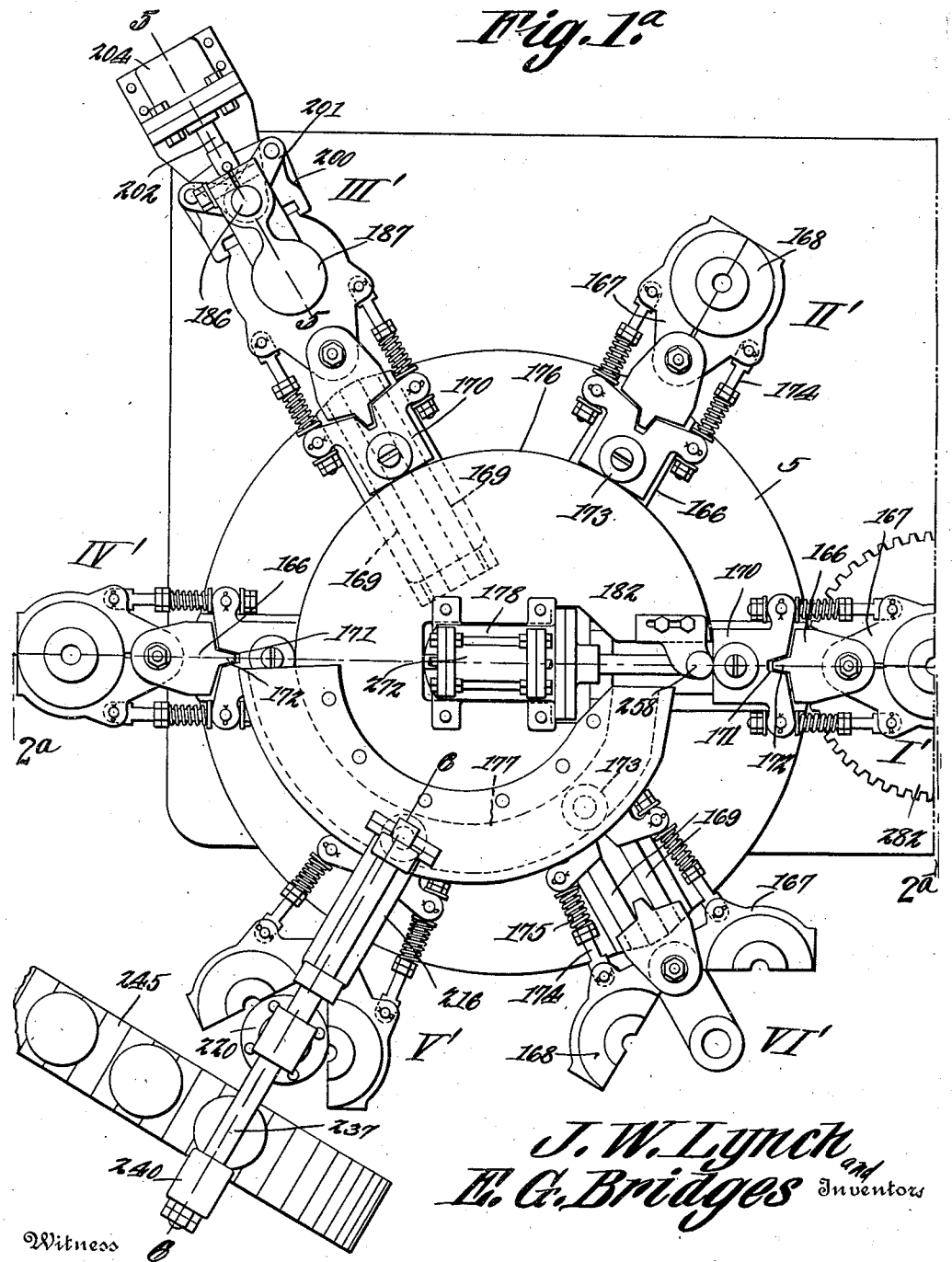

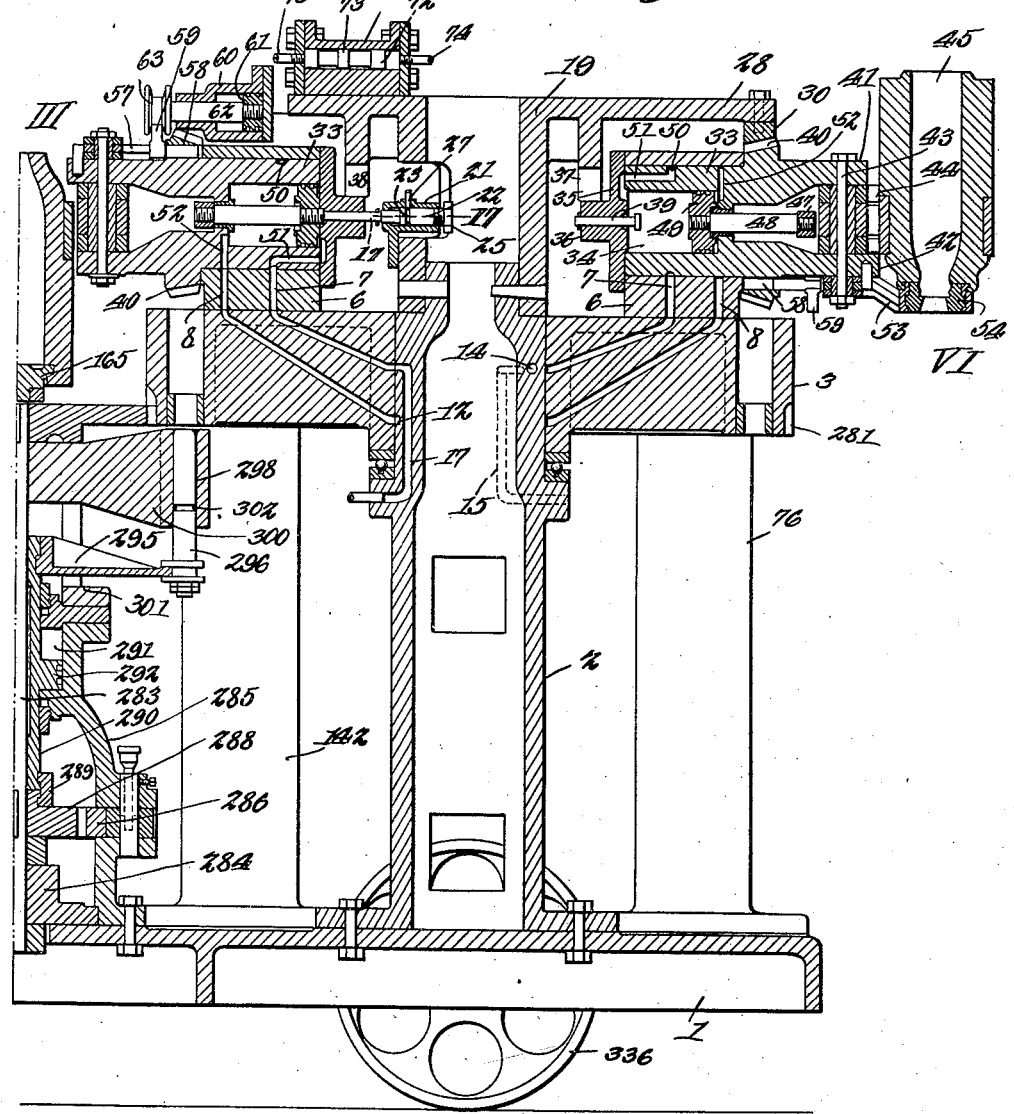

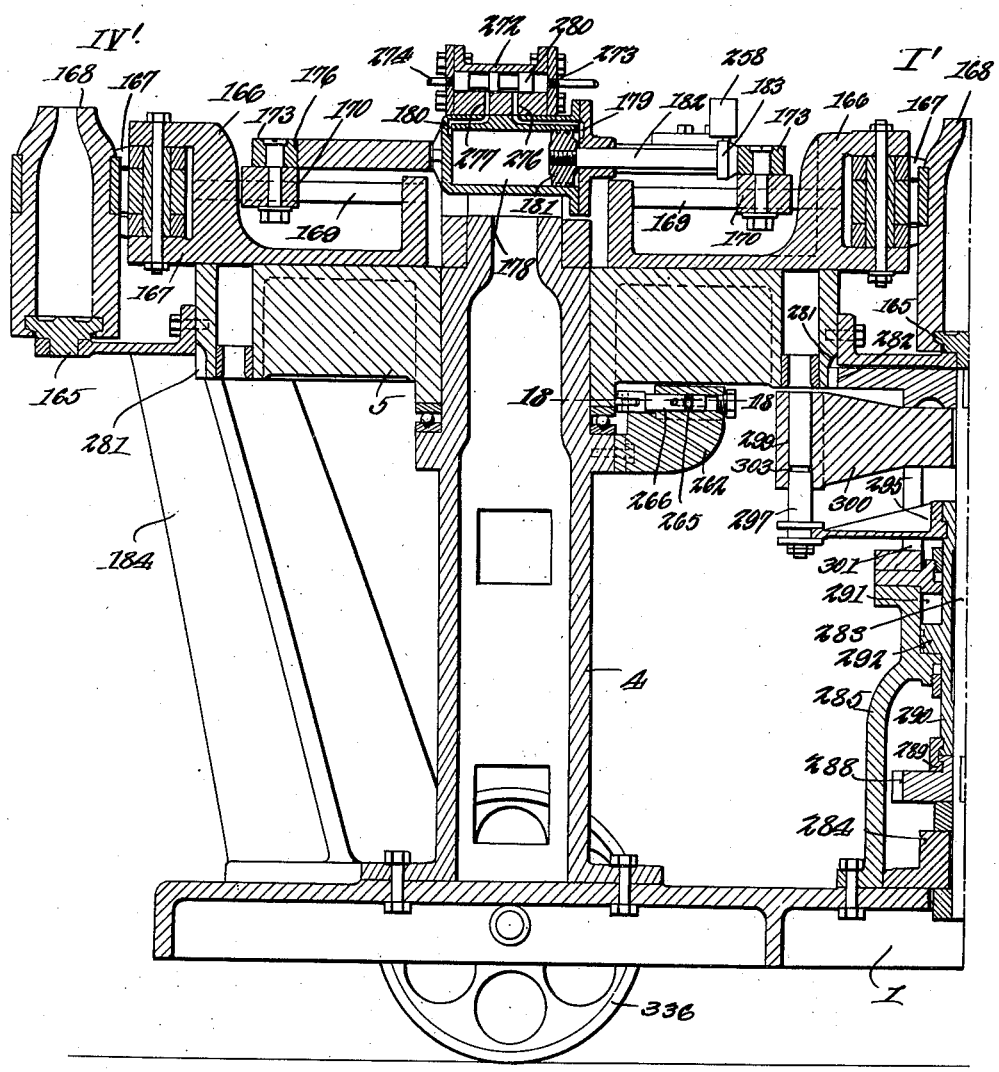

Jan. 6, 1931.   J. W. LYNCH ET AL   1,788,312
GLASS BLOWING MACHINE
Filed June 4, 1917    14 Sheets-Sheet 6

J. W. Lynch and
E. G. Bridges
Inventors by C. A. Snow & Co.
Attorneys.

Jan. 6, 1931. J. W. LYNCH ET AL 1,788,312
GLASS BLOWING MACHINE
Filed June 4, 1917 14 Sheets-Sheet 7
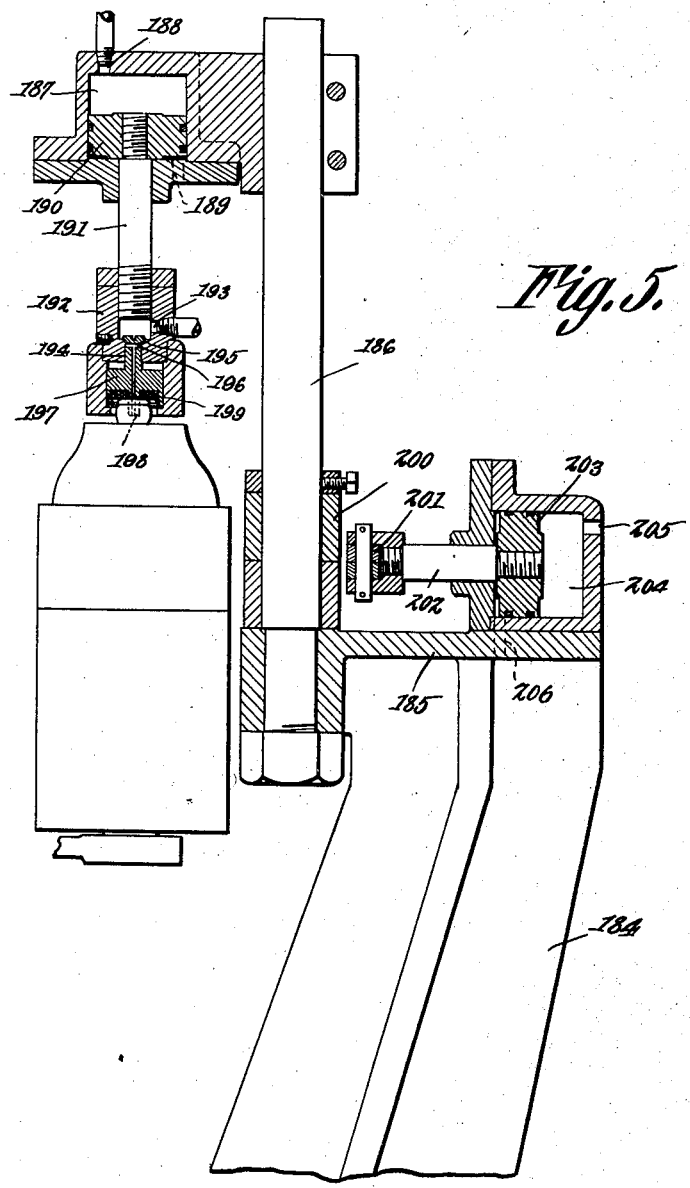

Jan. 6, 1931.  J. W. LYNCH ET AL  1,788,312
GLASS BLOWING MACHINE
Filed June 4, 1917  14 Sheets-Sheet 8
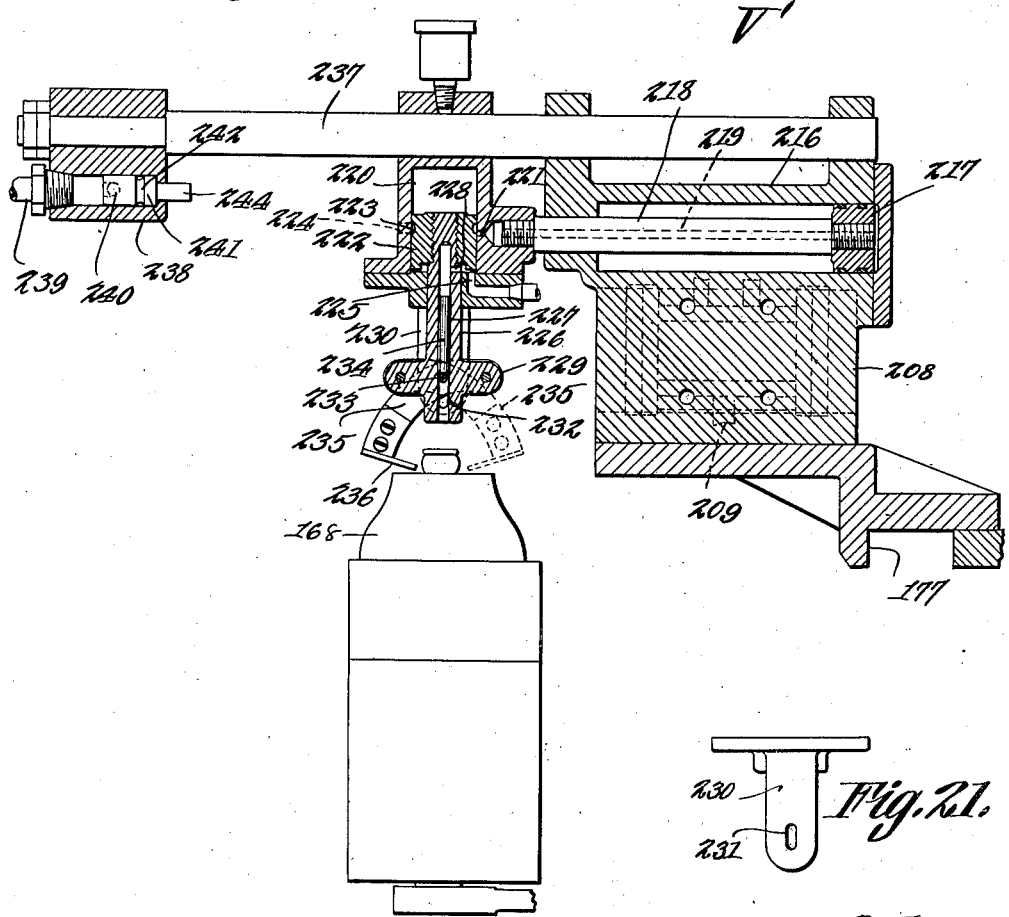
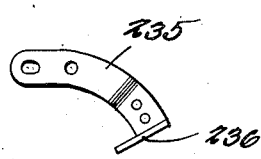
Inventors
J. W. Lynch and
E. G. Bridges
By C. A. Snow & Co.
Attorneys Jan. 6, 1931.   J. W. LYNCH ET AL   1,788,312
GLASS BLOWING MACHINE
Filed June 4, 1917   14 Sheets-Sheet 9

J. W. Lynch and
E. G. Bridges
Inventors

By C. A. Snow & Co.
Attorneys

Witness

Jan. 6, 1931.   J. W. LYNCH ET AL   1,788,312
GLASS BLOWING MACHINE
Filed June 4, 1917   14 Sheets-Sheet 10

J. W. Lynch and
E. G. Bridges
Inventors

Witness

By C. A. Snow & Co.
Attorneys

Jan. 6, 1931. J. W. LYNCH ET AL 1,788,312
GLASS BLOWING MACHINE
Filed June 4, 1917 14 Sheets-Sheet 11
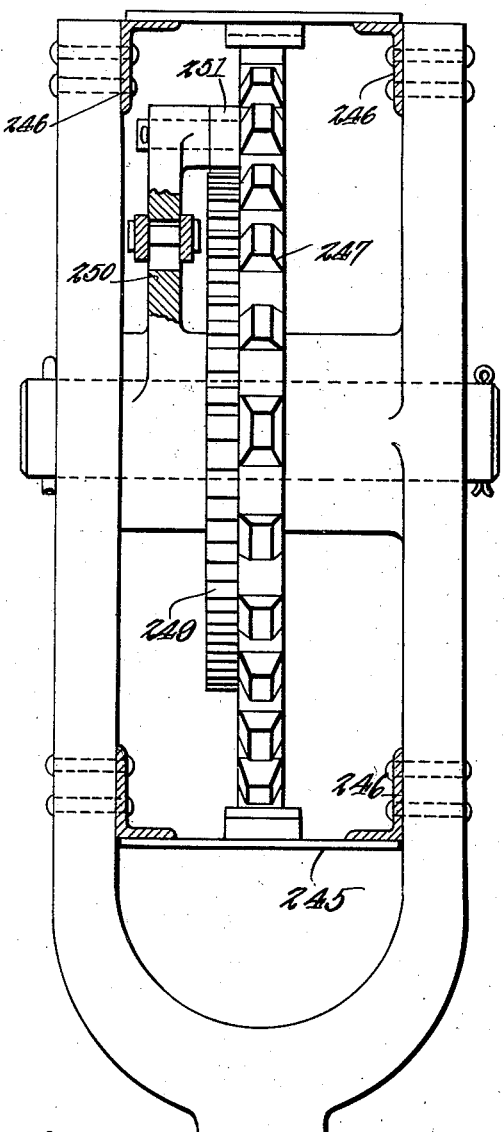
Fig.24.
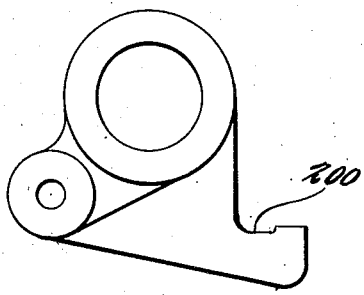
Fig.19.
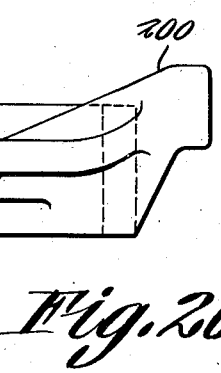
Fig.20.
J. W. Lynch and
E. G. Bridges
Inventors
By C.A.Snow & Co.
Attorneys Jan. 6, 1931.　　　J. W. LYNCH ET AL　　　1,788,312
GLASS BLOWING MACHINE
Filed June 4, 1917　　14 Sheets-Sheet 12
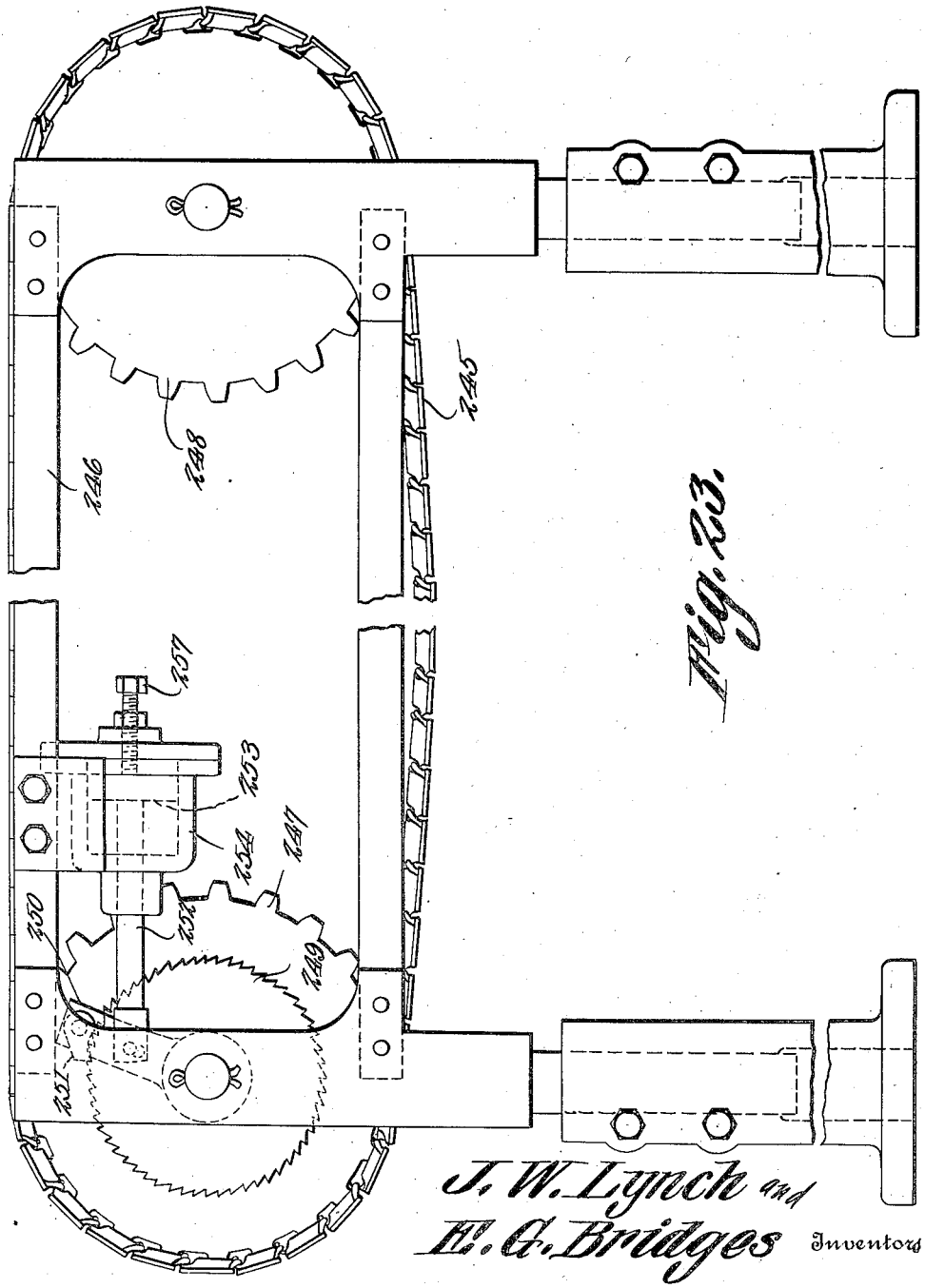

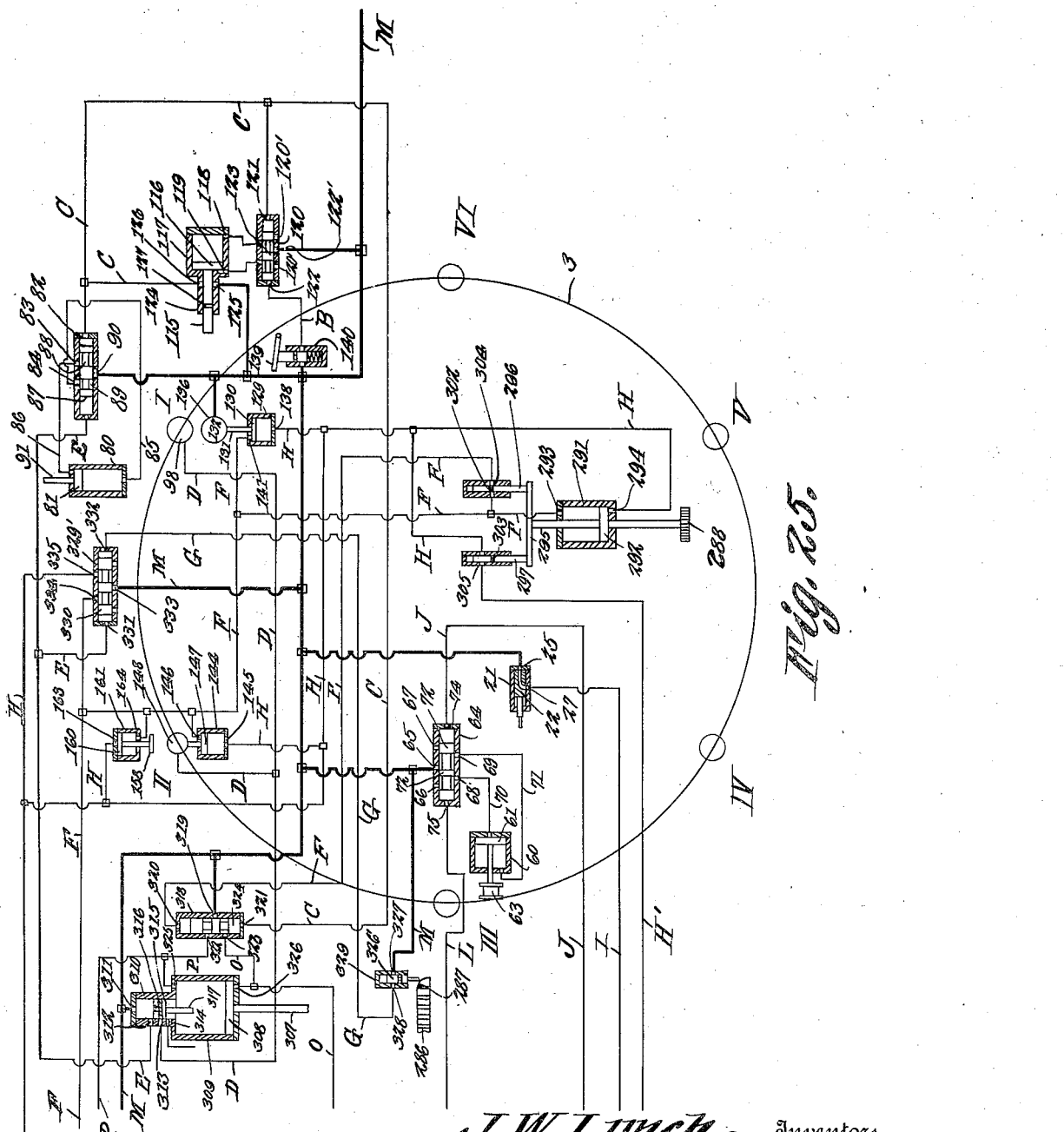

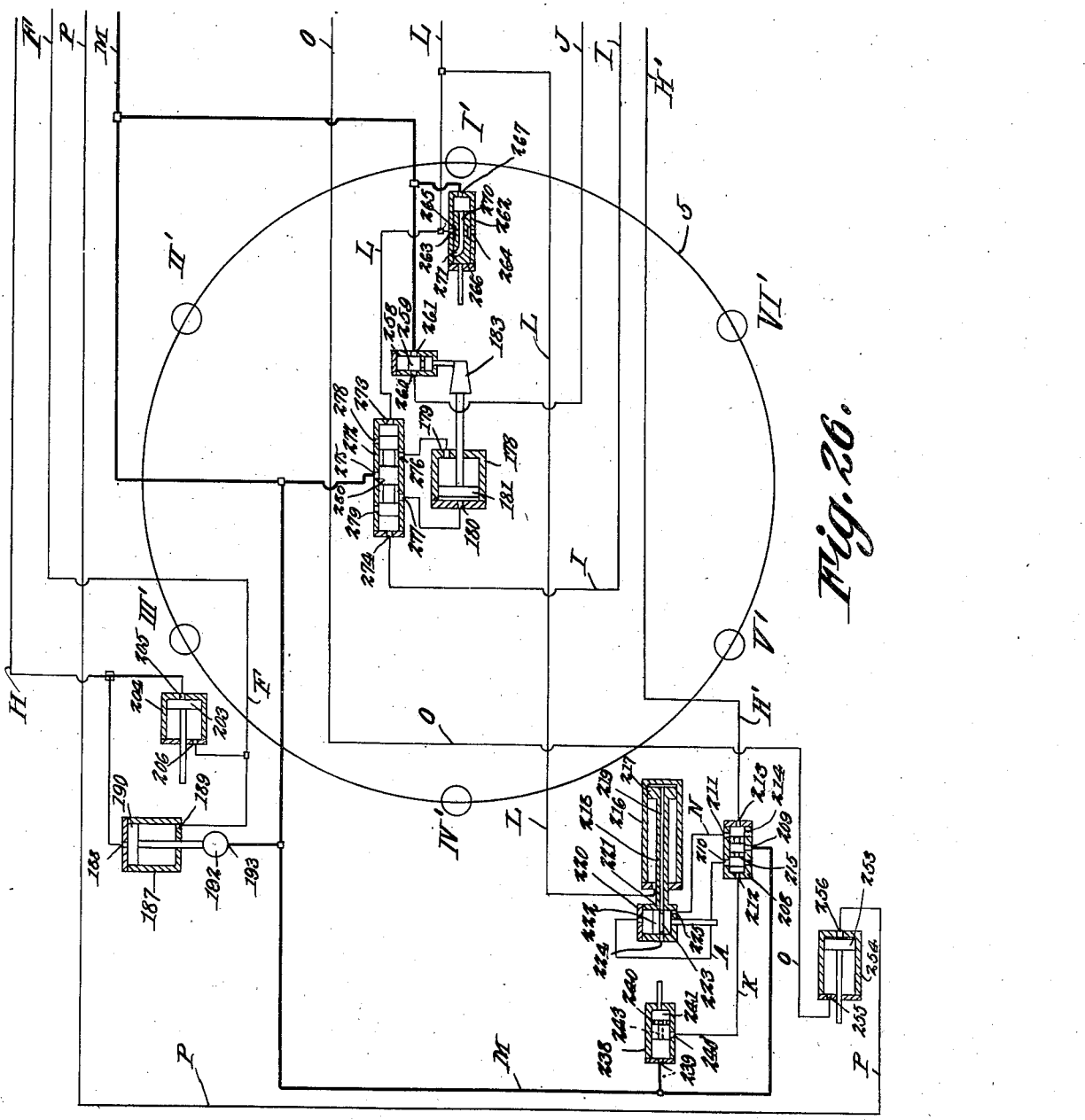

Patented Jan. 6, 1931

1,788,312

UNITED STATES PATENT OFFICE

JAMES W. LYNCH, OF ALEXANDRIA, INDIANA, AND EDWARD G. BRIDGES, OF ZANESVILLE, OHIO, ASSIGNORS, BY MESNE ASSIGNMENTS, TO LYNCH CORPORATION, A CORPORATION OF INDIANA

GLASS-BLOWING MACHINE

Application filed June 4, 1917. Serial No. 172,678.

This invention relates to a machine for blowing glass bottles and other articles and aims to provide automatic means for completing the article from a drop or "gather" of molten glass that may be fed to the machine automatically or by a workman. One of its objects is to provide a machine having separate tables mounted for rotation and designed to carry the blank molds and the blow molds respectively, said molds cooperating so as to transfer a blank from the blank mold to a blow mold.

A further object is to provide a machine of this character in which the blank is carried to a point where the transfer is effected by the blow mold on one table closing about said blank while it is suspended by a neck ring.

A further object is to provide revoluble tables both of which receive power from an interposed gear so that no loss of motion will occur as would be the case should motion be transmitted through either of the tables to the other.

A still further object is to provide novel means for mounting the blank molds whereby said molds will be opened and closed and modily inverted, and subsequently restored to their normal positions during each complete rotation of the table supporting the blank molds.

Another object is to provide pneumatic means controlled by the inversion and restoration of the blank molds for holding the members of the blank molds closed and for opening them at predetermined points during the progress of the mold with the rotating table.

A still further object is to provide means whereby both mold tables are simultaneously locked and unlocked, the same power utilized for this purpose being also employed for intermittently rotating the tables synchronously.

Another object is to provide simple and efficient means for automatically shearing the gather after being deposited in the blank mold at the first station of the cycle of operations, this shearing mechanism being quick and accurate in operation and compact in construction.

Another object is to provide pneumatically controlled means for swinging a blow head into position over the blank mold while at its first station and lowering it onto the mold to direct the air under pressure on to the contents of the mold thereby to pack the metal about a neck pin positioned in the bottom portion of the blank mold, the said blow head being automatically restored to its initial position during the movement of the blank mold to its next station.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the accompanying drawings, a preferred form of the invention is shown embodied in a machine arranged for hand feeding.

In said drawings:

Figure 1 is a plan view of the blank table and cooperating parts.

Figure 1ª is a corresponding view of the blow table and the corresponding parts.

Figure 2 is a central vertical section on line 2—2 through the structure shown in Figure 1.

Figure 2ª is a central vertical section on line 2ª—2ª through the structure shown in Figure 1ª.

Figure 3 is a section on line 3—3 of Figure 1.

Figure 5 is a section on line 5—5 of Figure 1ª.

Figure 6 is a section on line 6—6 of Figure 1ª.

Figure 15 is an elevation of the blow head guide at the first station of the blank mold.

Figure 19 is a plan view of one of the clamping jaws used with the blow molds.

Figure 20 is a side elevation of said jaw.

Figure 21 is an elevation of the guide provided for the gripping members of the delivery mechanism.

Figure 22 is a side elevation of one of the gripping members of the delivery mechanism.

Figure 23 is a side elevation of the conveyor mechanism.

Figure 24 is a view partly in elevation and partly in transverse section to the conveyor mechanism.

Figure 25 is a diagram of the blank forming mechanism and associated parts.

Figure 26 is a diagram of the parts assembled with the blow table.

Fig. 27 is a diagrammatic view of the complete machine, the parts being arranged and shown in sectional elevation.

In the several figures of the drawings, the parts of the machine are designated by the same characters of reference throughout the views:

Figure 4:
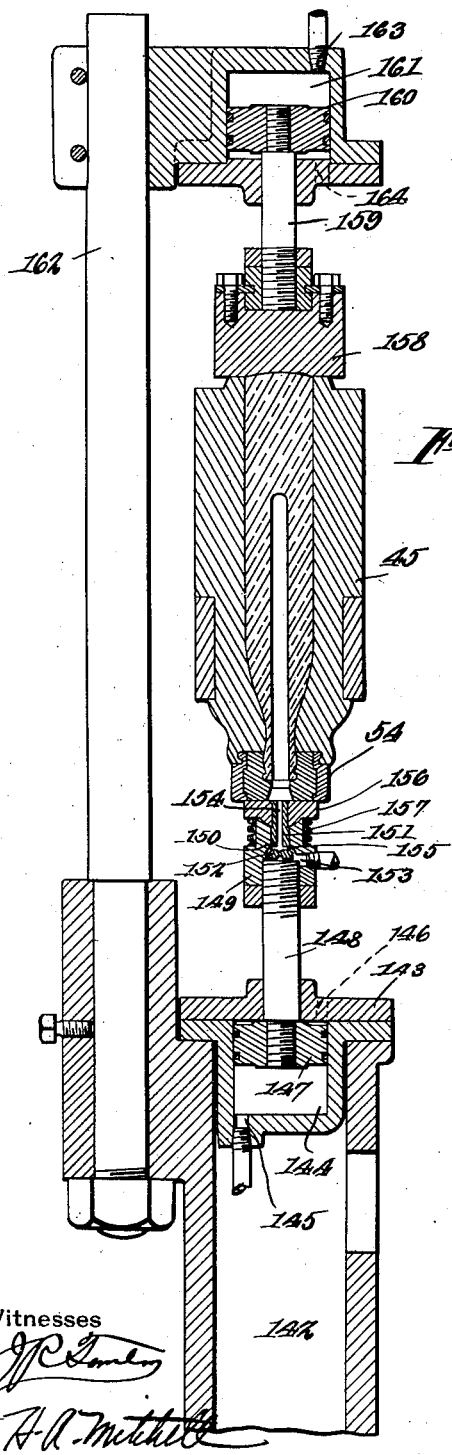
Figure 4 is a section on line 4—4 of Figure 1.

The type of machine illustrated is mounted upon a base 1 of suitable proportions adjacent one end of which is erected a pedestal or stand 2 designed to support the blank table 3 of the apparatus. A similar support or pedestal 4 is erected on the base adjacent the other end thereof and is designed to support the blow table 5. The blank table 3 is adapted to carry several blank molds hereinafter more fully described and which can be of any number desired. In the present instance six of these blank molds have been shown connected to the table 3, and each of the blank molds, during one complete rotation of the blank table, is adapted to stop at six distinct stations indicated at I, II, III, IV, V, and VI respectively. All of the blank molds are of the same construction, and they all operate successively in the same manner so that in describing the construction and operation of one mold it is to be understood that the same description applies to all of the molds on the blank table.

*Blank table and support*

Each blank mold unit (see Figs. 1 and 2) carried by the table includes a hollow bearing member 6 having separate air passages 7 and 8 extending downwardly therethrough and thence downwardly and inwardly within the table 3 so as to be opened and closed at certain points during the rotation of the table about the stand or pedestal 2 by the wall of said pedestal.

Figure 7:
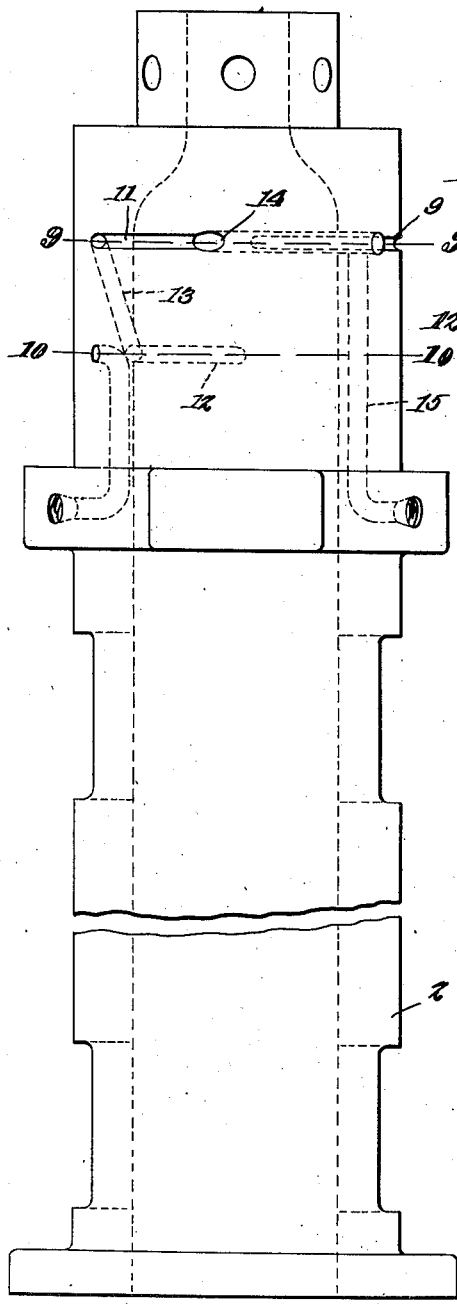
Figure 7 is an elevation of the pedestal or stand of the blank table.
Figure 8:
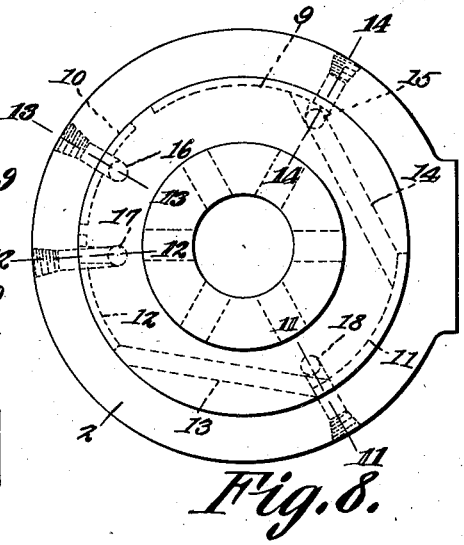
Figure 8 is a plan view of the structure shown in Figure 7.
Figure 9:
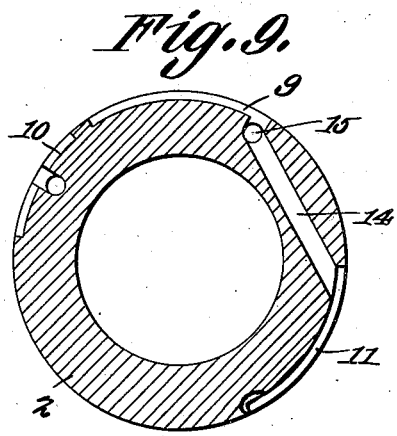
Figure 9 is a section on line 9—9 of Figure 7.
Figure 10:
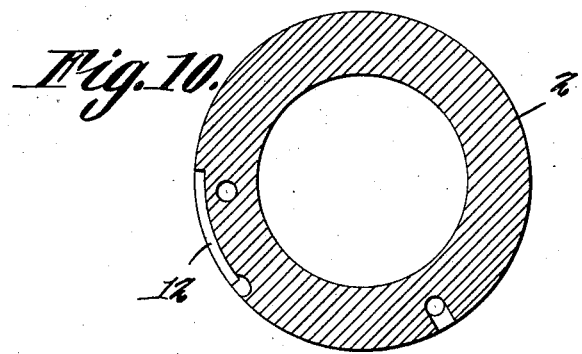
Figure 10 is a section on line 10—10 Figure 7.

Formed within the upper portion of the pedestal and in the same horizontal plane are three grooves 9, 10 and 11 (see Figs. 2, 7, 8 and 9) which are designed successively to register with the lower or inner end of the upper passage 7 during the rotation of the table. The groove 9 is so located that it will register with the passage 7 for closing the blank mold just prior to its arrival at station I, while the blank mold is at said station I, and also during the movement of the blank mold from station I to station II. The groove 10 is adapted to register with the passage 7 immediately after the blank mold leaves station II. Passage 7 remains in communication with the groove 10 until just prior to the arrival of the blank mold at station III at which time the lower passage 8 comes into register with a short lower groove 12 (Figs. 7, 8 and 10) in the stand or pedestal 2. This lower groove is in communication through an inclined passage 13 with the third upper groove 11 and remains in communication with the passage 8 until after the blank mold has left its station III and has almost reached its station IV. As the blank mold reaches its station V the upper passage 7 comes into communication with the groove 11 and this groove is in communication, through an oblique passage 14 with the groove 9. The groove 9 is adapted to receive pressure through a vertical bore 15 and another vertical bore 16 is adapted to direct pressure into the groove 10. Thus it will be seen that when air under pressure is directed into these two bores, the uniform pressure of air will be maintained in the grooves 9, 10, 11 and 12.

Figures 11, 12, 13, 14:
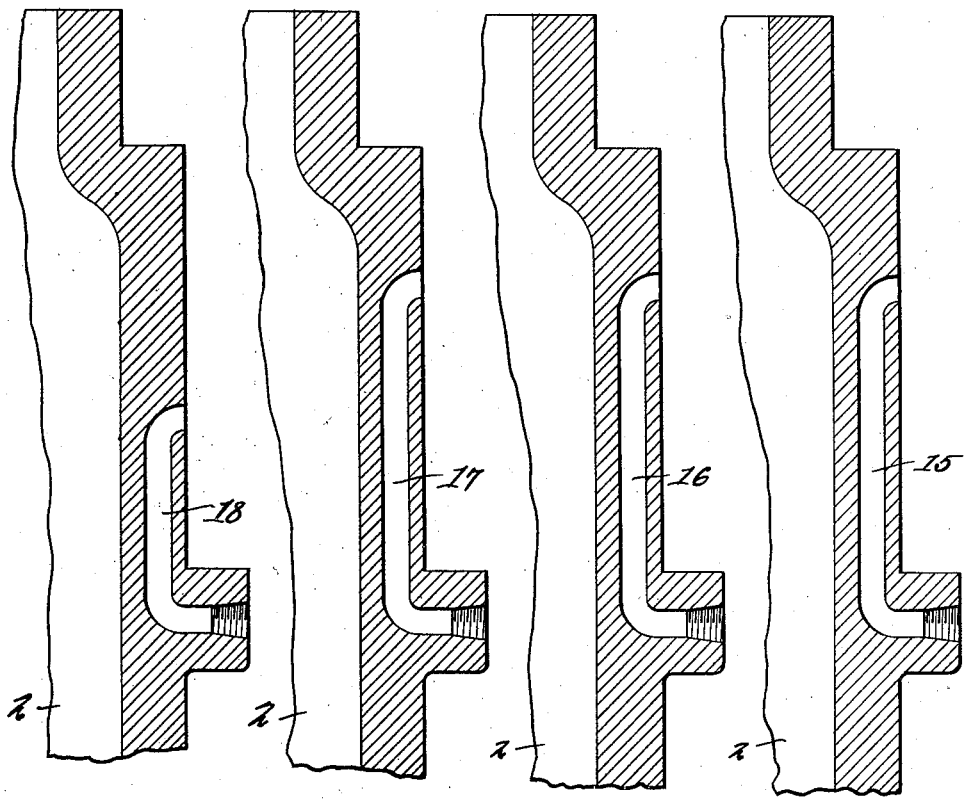
Figure 11 is a section on line 11—11 Figure 8.
Figure 12 is a section on line 12—12 Figure 8.
Figure 13 is a section on line 13—13 Figure 8.
Figure 14 is a section on line 14—14 Figure 8.

When the blank mold is at station III the upper passage 7 will communicate with an exhaust bore 17 (Figs. 8 and 12) formed in the stand or pedestal 2. Another exhaust bore 18 (Figs. 8 and 11) is formed in the stand or pedestal 2 and is adapted to register with the inner end of the lower passage 8 when the blank mold arrives at its station V.

Figure 17:
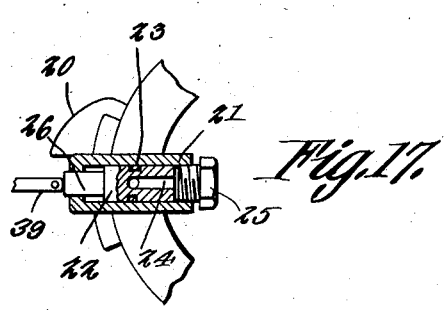
Figure 17 is a section on line 17—17 Figure 2 and showing the stationary valve at the delivery station of the blank mold.

Secured to and extending upwardly from the stand or pedestal 2 is a tubular extension 19 constituting a cam track, (see Fig. 2) there being formed on or secured to this extension along a radial line extending between stations II and III a cam 20 (Fig. 17). Connected to this cam track (see Fig. 17) on a radial line extending through station III of the blank mold is a valve casing 21 in which a valve 22 is mounted to reciprocate, this valve being provided with an annular groove 23 near its outer end and which groove communicates with a central bore 24 extending into the valve from its inner end. Thus when pressure from the main air line is directed against the inner end of the valve through a pressure port 25, the valve will be shifted against the opposite end of its casing 21 and the stem 26 of the valve will be pressed outwardly from the surface of the track or extension 19. When the valve is in this position, the groove 23 is out of register with an outlet port 27 (shown in Fig. 17).

Formed with or connected to the upper end of the track or extension 19 are oppositely extending segmental wings 28 and 29, (see Fig. 1) the wing 28 being arranged above the blank table 3 between stations V and VI while the peripheral portion of the wing 29 is arranged above the blank table 3 and extends over the space between stations II and III. Connected to or formed with the bottom face of the wing 28 (see Fig. 2) is an arcuate rack 30 while another rack 31 is arranged on the bottom face of the peripheral portion of the wing 29. The wing 28 has an extension 32 (see Fig. 1) which is arranged back from the rack on the wing 29 and extends over the table 3 at station III. These wings are of course fixed relative to the stand or pedestal 2 and the racks serve as operating means for the revoluble cylinders as will be hereinafter pointed out, while the wing 29 constitutes a support for the portion of the transfer mechanism to be described hereinafter.

*Blank mold inverting mechanism*

Figure 16:
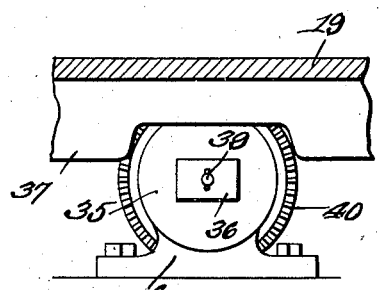
Figure 16 is a rear elevation of the holding block of one of the blank molds, and portions of the adjacent molds cooperating therewith.
Figure 18:
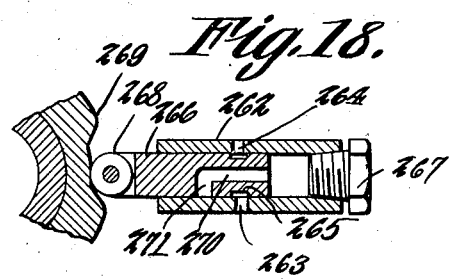
Figure 18 is a section through the cam actuated valve at the transfer station of the blow table, said section being taken on the line 18—18 Figure 2ª.

Journaled within each of the bearing members 6 is a cylinder 33 (see Fig. 2) having a piston chamber in its inner end as indicated at 34 and the inner end of this piston chamber is closed by a head 35 from the center of which projects an angular boss 36 (see Figs. 2 and 16). This boss is provided with diametrically opposed flat faces parallel with each other and one of these faces is adapted, during the movement of the blank mold from station I to station II to ride along the lower edge of a track 37 depending from the top portion of the extension 19. Thus during this portion of the movement of the blank mold about the stand or pedestal 2 the cylinder 33 cannot rotate about its longitudinal axis and such rotation can only occur after the boss 36 has passed out of engagement with the lower edge of the track 37. Another similar depending track 38, (see Fig. 2) extends downwardly from the upper portion of the extension 19 and located between stations III and V and is adapted to be engaged by the other flat face of the boss after the revoluble cylinder has been turned one half revolution, as hereinafter described, thus to hold the revoluble cylinder against movement out of the position to which it has been turned.

Slidably mounted in the cylinder head 35 is a plunger 39 (see Fig. 2) and this plunger is adapted, when the blow mold is brought to station III, to aline with the stem 26 of valve 22, said plunger being pressed outwardly into the piston chamber 34 by coming against the cam 20 (see Fig. 17) just prior to the arrival of the plunger 39 at station III. Formed on or secured to the cylinder 33 close to the outer face of the bearing member 6 is a gear 40 adapted, during each complete rotation of the blank table to successively engage the racks 30 and 31, it being understood that each rack is so proportioned relative to the gear that it will cause the gear to make a one half revolution while passing from one end to the other of the rack. Extending from the outer face of the gear 40 (see Figs. 1 and 2) are upper and lower ears 41 and 42 and these ears are connected by a pivot pin 43 on which are mounted arms 44 extending from the opposed members 45 of the blank mold. Pivotally connected to each of the arms 44 adjacent the center thereof and close to its mold member 45 is a link 46, the two links of the mold being extended inwardly and attached to a cross head 47 which extends between the upper and lower ears 41 and 42. This cross head is attached at its center to the rod 48 of a piston 49 mounted to reciprocate in the cylinder chamber 34. An annular groove 50 is formed in the cylinder 33 and constantly communicates with the passage 7. A passage 51 extends longitudinally within the wall of cylinder 33 and connects the groove 50 with the inner end of the cylinder where it opens through a port into the inner end of the piston chamber 34. A port 52 is formed in the outer end portion of the cylinder 33 and is adapted, when the cylinder is rotated through 180°, to come into register with the upper end of the passage 8 thus to direct air under pressure from said passage against the outer face of the piston 49.

Assuming that air under pressure is supplied to the bores 15 and 16 (see Figs. 2, 7, 8, 13 and 14) and is thus distributed to the grooves as hereinbefore described, it will be apparent that when the blank mold arrives at station I the passage 7 and groove 9 will direct pressure by way of groove 50 and passage 51 to the back face of the piston 49 with the result that said piston will be directed outwardly against the outer end of the chamber 34 and the links 46 will press against the arms 44 to hold the mold members tightly together. As the blank mold moves from station I to station II the pressure against the piston 49 will be maintained through the groove 9. Immediately after the blank mold leaves station II the gear 40 will engage the rack 31 so as to rotate the cylinder through 180°, thereby to invert the blank mold pressure being maintained back of the piston 49 during this rotation through the annular groove 50. Just as the cylinder completes its half revolution about its longitudinal axis the port 52 will be brought into register with passage 8 so that pressure through groove 12 will thus be directed against the outer face of the piston 49 and said piston driven inwardly so as to pull on links 46 and move the mold members 45 apart. During this inward movement of the piston the passage 7 has been brought into register with the exhaust bore 17. The groove 12 through which pressure is distributed to the outer face of the piston 49 when the mold is at station III, continues to direct pressure against said piston until just prior to the arrival of the mold at station IV. When the mold arrives at station V, the passage 8 comes into register with the exhaust bore 18 and the passage 7 comes into register with the groove 11 so that pressure is directed from said groove 11 and the passage 7 to the back face of the piston 49 with the result that the members of the blank mold are swung together and are maintained in this position while the mold is moving from position V to position I. Pressure is maintained against the piston while the mold is moving from position V to position VI and during this stage of the movement of the mold the gear 40 comes into mesh with the rack 30, thus causing a one half revolution of the cylinder 33 so that when the cylinder arrives at station I it will have the same position as when it started its cycle of movement.

*Neck ring*

Pivotally mounted on one end portion of the pin 43 (see Figs. 1 and 2) are oppositely extending jaws 53 to the outer ends of which are attached segmental members 54 constituting the sections of the neck ring. These sections are adapted to close together at the neck end of the blank mold, and are adapted to be surrounded by a portion of the blank mold as is usual in devices of this character. Connected to the jaws 53 between their ends are links 55 and these links are in turn attached to a cross head 56 which has a guide pin 57 slidably mounted in an opening 58 formed in the gear 40. A lug 59 projects from the cross head 56 and extends downwardly when the mold is at station I but projects upwardly when the mold is at station III. When the lug and cross head are at their outermost positions, the links 55 press against the jaws 53 and hold the members of the neck ring closed together, but when the lug 59 and its cross head are drawn inwardly the members of the neck ring are shifted away from each other.

Mounted on the extension 32 of the wing 29 at station III is a cylinder 60 containing a piston 61 from which projects a stem 62. Connected to the outer end of this stem is a spool 63 and this spool is designed to be held at its outermost position under normal conditions so that when the blank mold arrives at station III the lug 59 will enter the groove in the spool.

Mounted on the wing 29 is a valve casing 64, (see Figs. 2 and 25) this casing being provided with a pressure inlet port 65, exhaust ports 66 and 67, and outlet ports 68 and 69. The outlet port 68 is located between the inlet port 65 and the exhaust port 66, while the outlet port 69 is located between the inlet port 65 and the exhaust port 67. Constant pressure is directed against the port 65 and the outlet port 68 communicates with the inner end of the cylinder 60 through a passage 70. A passage 71 connects the outer end of the cylinder 60 to the outlet port 69.

A valve 72 is mounted to reciprocate within the casing 64 and has a centrally enlarged portion 73 adapted to normally close the port 65 and also having enlarged end portions or heads. These heads are adapted to alternately close the exhaust ports 66 and 67. A pressure inlet port 74 is formed in the inner end of the valve casing 64 and another pressure inlet port 75 is formed in the outer end of the valve casing. Thus it will be seen that when pressure is directed through port 74 against the valve 72, which action will take place when the mold reaches station III, the inlet port 65 will be placed in communication with the outlet port 69 while the outlet port 68 will be placed in communication with the exhaust port 66. Thus air under pressure will flow through the passage 71 and against the outer face of the piston 61, forcing said piston inwardly and causing the spool to pull the lug 59 inwardly and move the members of the neck ring away from each other.

The foregoing operation is preferably so timed relative to the opening of the blank mold at station III that the members of the neck ring will not open out until after the members of the blank mold have become disengaged from the glass article and the members of the blow mold hereinafter referred to have engaged the article.

It may be stated at this time that when the members of the blank mold are moved apart at station III the piston 49 will strike the plunger 39 (Fig. 17) and force it against the stem 26 of valve 22 thus causing said valve to shift inwardly and bring the pressure inlet 25 into communication with the outlet port 27. This will control certain other operations as will be hereinafter pointed out.

*Blow head*

Mounted on the base 1 adjacent station I is a standard 76 (see Fig. 3) having a laterally extending sleeve 77 in which is slidably mounted a post 78 which can be adjusted to any desired elevation and held by a set screw or in any other approved manner.

Mounted on the upper end of this post is a blow head table 79 containing a cylinder 80 in which a piston 81 is mounted to reciprocate. Arranged on one side of the cylinder 80 is a valve casing 82 which is provided, near each end, with an outlet port, (see Fig. 25) one of which has been indicated at 83, while the other has been indicated at 84. The port 84 is in communication, through a passage 85 with the lower end of the cylinder 80 while the port 83 is in communication through a passage 86 with the upper end of the cylinder. A valve 87 is slidably mounted within the casing 82 and has annular grooves 88 and 89 designed, when the valve is shifted in one direction, to establish communication between port 84 and the pressure port 90 and, when shifted in the opposite direction, to establish communication between port 83 and the pressure port 90. The port 90 is connected to a pressure pipe as hereinafter pointed out.

A rod 91 (Fig. 3) extends upwardly from the piston 81 and is provided, at its upper end, with a head 92. This head has a stud 93 extending therefrom on which is journaled a roller 94 adapted to work up and down within a cam slot 95 (Fig. 15) formed within an upstanding guide plate 96 mounted on the table of the blow head. Thus it will be seen that during the upward movement of the piston 81 the cam slot will swing the head laterally after it has moved straight upward a short distance and, during the downward movement of the piston the head 92 will be swung laterally and then moved straight downwardly. Extending from the head 92 is an arm 97 to the outer end of which is attached a cylinder 98. Air under pressure is adapted to be directed, under certain conditions to the upper end of the cylinder through a flexible pipe a portion of which has been indicated at 99 and the lower end of the cylinder is provided with an air outlet 100 in which a tubular stem 101 is adapted to slide. This stem is provided at its upper end with an enlargement 102 constituting a valve which rests normally on a seat 103 in the bottom portion of the cylinder 98, and serves to prevent under normal conditions the escape of air downwardly from the cylinder. Radial ports 104 open into the stem below the valve portion thereof so that when the valve is pushed upwardly away from its seat air will be free to escape through the ports 104 and downwardly into the stem.

A disk 105 is carried by the lower end of the stem and constitutes a blow head, this disk being provided at and near its center with outlet ports 106 in communication with the interior of the stem. Thus it will be seen that when the head 92 moves downwardly as hereinbefore described the blow head 105 will come against the upper end of the blank mold at station I and will be shifted relative to the cylinder 98 so that valve 102 will be unseated and the air under pressure within the cylinder will be discharged downwardly on to the gather which may have been deposited in the blank mold at station I. When the head 92 is pushed upwardly it will first move the blow head straight up away from the blank mold and then swing it to one side and on the downward movement of the head 92 this motion will be reversed. Consequently when the blow head is in its normal position it is above but at one side of the blank mold at station I and will not interfere with the placing of a gather downwardly into the blank mold.

*Shearing mechanism*

Upstanding from the blow head table 79 (Fig. 3) at the inner edge thereof is a pivot pin 107 securing a spring disk holder 108 on which is mounted a ring 109 adapted, when a blank mold is brought to position at station I, to overhang and contact with the upper end of said blank mold. The pin 107 also serves as a pivot for the intermediate portions of crossed levers 110, each lever having one arm sharpened to constitute a shear blade 111 while the other arm of each lever is slotted longitudinally as at 112 (see Fig. 1). The two slotted arms are slidably engaged by studs 113 (Fig. 1) extending from the free ends of a fork 114 provided at one end of a stem 115 projecting from a piston 116. This piston is mounted to slide in a cylinder 117, said cylinder having ports 118 and 119 at the outer and inner ends thereof respectively and which ports communicate with the valve casing 120. Another port 121 (Fig. 5) is arranged at one end of the valve casing 120 and another inlet port 122 is provided at the other end of the casing 120. A pressure inlet port 122' is located between the ends of the casing 120 and exhaust ports 120' are also provided. A valve 123 is slidably mounted in the casing 120 and, when pressure is directed through port 122 against one end of this valve said valve is shifted so as to close communication with port 118 and pressure will be directed from line M to port 119.

The stem 115 of piston 116 slides within a casing 124 and this casing has opposed ports 125 and 126 (see Fig. 25). An annular groove 127 is formed in the stem 115 and when the piston 116 is forced in one direction, on the shearing stroke by the admission of pressure through port 119, this stem 115 will be moved with the piston to bring the groove 127 into register with the two ports 125 and 126, thus to establish communication between the two ports.

A spring 128 is mounted on the pivot pin 107 and bears downwardly on the levers 110 so as to bind them together.

As the piston 116 is normally pressed toward the guide plate 96, the two shearing blades are normally held apart. However, when pressure is directed against the inner face of the piston 116 so as to force it in the other direction these blades will be swung toward each other so as to shear the gather suspended therebetween, this shearing action taking place directly over the ring 109.

Neck pin mechanism

Carried by the upper portion of the standard 76 is a cylinder 129 in which a piston 130 is mounted to slide. This cylinder has slight freedom of movement to allow the neck pin to adjust itself laterally to the neck ring of the adjacent cooperating blank mold. The stem 131 of this piston projects upwardly beyond the top of the standard and is provided, at its upper end, with a head 132 from the top of which extends a tapered plunger or neck pin 133. This neck pin is hollow but closed at its upper end and extending from the base portion of the plunger or neck pin are radial outlets 134 communicating with the interior of said plunger or neck pin. A bore 135 is formed in a stem 131 and has a pressure inlet port 136 while extending from the upper end of the bore is a tubular nozzle 137 extending into the hollow plunger or neck pin but spaced from the walls thereof. Thus it will be seen that air under pressure when directed into the stem 131 will be discharged upwardly against the inner walls of the plunger or neck pin 133 and will then flow downwardly around the nozzle 137 and out through the oulets 134. This acts as a means for cooling the neck portion of the partially completed blank when the gather is packed into the blank mold.

An inlet port 138 is provided in the bottom of cylinder 129 so that when air under pressure is directed therethrough the piston 130 will be raised and the neck pin or plunger elevated into the neck ring 54 at the lower end of the mold at station I.

Operation at station I

Pressure is adapted to be directed to the different ports at station I as heretofore indicated and through a system of air conductors which will be hereinafter more fully described. When the blank mold arrives at station I in its inverted and closed position, the gather depending from a punty is lowered into the blank mold. Referring to Fig. 25, during the downward movement of the punty it comes into contact with a lever 139 which, when depressed by the punty, will shift a punty valve 140. This punty valve controls the admission of pressure from a supply to the port 122 of valve 123 and when shifted pressure will be directed to this port. Thus valve 123 will be immediately shifted longitudinally to direct pressure to the port 119 and cylinder 117, and the piston in said cylinder will be shifted outwardly and cause the shearing blades to be quickly drawn together to sever the supported gather. Immediately subsequent to this severing action the groove 127 establishes communication between the pressure supply through the ports 125 and 126 and causes the pressure to be distributed to one end of the valve casing 82 and to the port 121. The pressure directed into port 121 will restore the valve 123 to its initial position and will direct pressure through port 118 against the outer face of the piston 116 so that said piston and its stem 115 will be shifted inwardly to their first positions. The pressure directed into the end of the valve casing 82 will shift the valve 87 out of its normal position so as to direct pressure through the valve casing by way of groove 88 into the upper end of the cylinder 80, thus to force the piston 81 downwardly. Obviously the shearing action will be almost instantaneous and will take place before the blow head can be lowered. As the blow head is lowered by the downward movement of piston 81 the various parts will operate as hereinafter pointed out, the disk 105 coming against the ring 109 so that pressure will be promptly directed downwardly on to the gather. This gather will be packed about the neck pin or plunger 133 which, previously has been elevated into the neck ring at the lower end of the mold. It is of course to be understood that the blank mold is so positioned on the blank table that it will be supported in proper position to receive the neck pin or plunger and to be engaged by the blow head at station I.

The cylinder 129 has an inlet port 141 and this port as well as the port 138 are in communication with certain pressure conductors as will be hereinafter described so that the neck pin or plunger will be withdrawn from the neck ring at station I immediately after the packing of the gather about said neck pin or plunger and just prior to the movement of the blank mold from station I to station II.

Blank blowing mechanism

Erected on the base 1 at station II is a standard 142 (see Fig. 4) supporting a table 143 to which is connected a cylinder 144, this cylinder being provided with a port 145 at the bottom thereof and another port 146 at the top thereof. A piston 147 is mounted to slide within the cylinder and has a stem 148 projecting upwardly therefrom and carrying a blow head 149 having a central bore 150. Slidably mounted within this bore is a stem 151 extending from a valve 152 and this valve is adapted normally to press against a seat at the lower end of the bore 150. A port 153 is designed to direct pressure into the blow head and below the valve 152. The stem 151 of the valve has a passage 154 extending from the upper end thereof to a point close to the valve 152 and radial ports 155 are formed in this stem 151 close to the valve. When the valve is seated by the pressure of air thereagainst from port 153 the ports 155 will be closed. Disk 156 is connected to the upper end of the valve stem 151 and a spring 157 serves to hold this disk normally elevated and the valve 152 normally on its seat. However, when the blow head is elevated so that the disk 156 will come against the neck ring of the blank mold at station II, the blow head 149 will move upwardly against the disk 156 and cause the valve 152 to be unseated so that pressure will thus pass from the port 153 through the radial ports 155 and the passage 154 and thence into the recess in the blank which had been formed at station I by the neck pin or plunger. Consequently the gather will be initially blown.

For the purpose of finishing the upper end of the blank at station II and also limiting the upward movement of the blown gather, a baffle disk 158 (Fig. 4.) is connected to the lower end of the stem 159 and a piston 160. This piston is mounted to slide within a cylinder 161 attached to the upper end of a post 162, which post is adjustably connected to the standard 142. The cylinder 161 has a port 163 at its upper end and another port 164 at its lower end, and when pressure is directed into the lower port the baffle disk will be raised. While pressure is directed into the upper port the baffle disk will be lowered as will be obvious. The two pistons 147 and 160 are adapted to be operated simultaneously by means of pressure in the air system to be hereinafter described, as soon as the blank mold stops at station II.

*Blow table*

The blow table 5, (Figs. 1ᵃ and 2ᵃ) which is mounted for rotation on a stand or pedestal 4 is spaced from the blank table 3 and is provided at its periphery with a series of mold bottoms 165 equal in number to the number of blow molds assembled with the table. In the present instance six blow molds have been illustrated, but it is to be understood that this number may be increased or reduced if desired. The two tables are adapted to rotate in unison by means of mechanism hereinafter more fully described so that each time a blank is brought to position at station III and while said blank is being suspended solely by the neck ring of the blank mold, a mold bottom 165 is brought to position under the supported blank and an open blow mold is brought to position to grip the suspended blank, this gripping action taking place immediately prior to the release of the blank from the neck ring members of the blank mold. In order that this operation may take place it is necessary that the members of the blank mold members and the members of the blow mold be coupled to occupy positions concentric with a common center, during the transfer of the blank from one table to the other.

The blow molds, where six of them are used, are adapted successively to assume every one of six stations indicated respectively at 1', II', III', IV', V', VI'. Station I' is located at the point of transfer and the other stations are disposed successively in counter-clockwise arrangement about the table 5. As all of the blow molds are of the same construction, it is deemed necessary to describe only one of them in detail, it being understood that each blow mold passes successively to all of the stations of the blow table and returns to station I' after it has completed one cycle.

Referring to Figs. 1ᵃ and 2ᵃ one of the mold bottoms 165, as before stated, is provided for each blow mold, these bottoms being adapted to assume positions successively under the blanks successively brought to the point of transfer. Mounted on the table 5 at regular intervals are brackets 166 each of which has pivotally connected to the outer end portion thereof arms 167 extending from the respective members 168 of the blow mold. Guide rods 169 are carried by the bracket and slidably mounted on these rods is a cross head 170 having a centering recess 171 adapted, when the cross head is in its outermost position relative to the bracket to receive a centering lug 172 extending inwardly from the bracket. The cross head has a roller 173 on its upper face and slidably mounted in the sides of the cross head are links 174 the outer ends of which are pivotally attached to the respective arms 167. Springs 175 are mounted on these links and are adapted when the cross head is pressed outwardly to thrust against the links and press the members of the blow mold together. A push cam 176 is fixedly mounted above a table and extends from station I' to station IV' and when the blow mold is passing from station I' to station IV' the roller 173 will travel along the periphery of this push cam so as to hold the members of the blow mold closed together tightly.

Fixedly mounted above the blow table so as to extend from stations IV' to I' is a pull cam 177 designed to receive the roller 173 as it leaves station IV' and gradually pull said roller inwardly as it passes to the next two stations V' and VI', this pulling action serving to pull the members of the blow mold gradually to open positions until, when the blow mold reaches and passes station VI' the members of the blow mold are drawn back close to the periphery of the blow table so that they can move readily into position at station I' without coming into contact with the blank mold and the blank which have been brought to station III of the blank table. As soon as the blow mold reaches station I' the roller 173 will pass off of the end of pull cam 177 and into the path of setting mechanism provided therefor.

Setting mechanism

Mounted on the pedestal or stand 4 and above the blow table is a cylinder 178 (Figs. 1ª and 2ª) having end ports 179 and 180 and slidably mounted in this cylinder is a piston 181 the stem 182 of which is adapted to work along a radial line extending to station I'. This stem is provided at its free end with a tapered button 183, and when the roller 173 passes off of the end of pull cam 177 at station I' it arrives in position in the path of this button so that when pressure is at this time directed from port 180 against the piston 181 the button 183 will be pressed outwardly against the roller and cause the cross head 170 to slide outwardly along its guide rods 169 and until it comes against the outer portion of the bracket 166. This action will cause the members of the blow mold to swing together under the neck ring sections of the blank mold and about that portion of the blank which has been released from engagement with the members of the blank mold. This outward movement of the cross head 170 also brings the roller 173 into position where it can pass into engagement with the periphery of the push cam 176 when the blow mold begins to leave its station I'.

Finishing apparatus

The blow mold when it leaves station I' carries the blank to station II' where it is held firmly in the blow mold and then passes to station III'. During the time the blow mold stands at station II' the blank has sufficient time to reheat thus melting the skin or enamel which has been chilled by the contact with the blank mold and blow mold to melt to the approximate temperature to the remaining portions of the blank or parison. Such reheating is advantageous as otherwise, if the blank or parison is blown to final form immediately following the transfer to the blow mold, the outer skin or enamel tends to crack permitting the hotter or more fluent glass to work through the crack producing an undesirable mark or score on the finished bottle. At station III' the blowing of the blank is completed by the use of a special blow head provided for that purpose. Referring to Figs. 1ª and 5 a standard 184 is mounted on the base 1 at station III' and supports a table 185 to which a post 186 is secured. Adjustably mounted on this post is a cylinder 187 having ports 188 and 189 in the top and bottom thereof respectively and which are adapted to receive pressure as hereinafter pointed out.

A piston 190 is slidably mounted in the cylinder and has a stem 191 projecting downwardly therefrom and connected, at its lower end, to a blow head 192. This blow head has a pressure port 193 opening thereinto and below the pressure port is a bore in which is slidably mounted the stem 194 of a valve 195. This stem has a passage extending thereinto from its lower end and radiating from the upper end of the passage are ports 196 located under the valve so that when the valve is seated communication will be closed between these ports and the pressure port 193. A disk 197 is slidably mounted in the lower portion of the blow head and moves with the stem of the valve, there being a nozzle 198 projecting downwardly from the center of the disk, the passage in the valve stem extending through this nozzle. A washer 199 preferably of asbestos is seated on the bottom face of the disk 197 and extends around the nozzle 198. It will be apparent that when pressure is directed on to the upper face of the piston 190, the blow head will be lowered so that the washer 199 will come against the mouth of the blank held in the mold at station III' and the nozzle 198 will project into the blank. The pressure of the washer on the blank will cause the valve 195 to be unseated so that pressure will pass from port 193 through the passage in the valve stem and through the nozzle into the blank. Leakage of air from the blank is prevented by the washer 199. When pressure is directed against the bottom of the piston 190 said piston will be raised and the blow head removed from the blank so that valve 195 will close automatically.

In order that the blow mold shall be securely held together during the blowing operation, a clamping mechanism is provided at station III'. This mechanism includes opposed jaws 200 which are pivotally mounted on the post 186 and are normally spread apart. Links 201 are connected to the rear ends of the jaws back of the pivotal connections with the post and these links are in turn pivoted to the stem 202 of a piston 203. This piston is slidably mounted in a cylinder 204 mounted on the table 185 and the said cylinder is provided at its ends with ports 205 and 206 respectively. Thus when the blow mold arrives at station III' pressure will be instantly directed, as hereinafter described through port 205, thereby forcing the piston 203 inwardly so that the stem of the piston will push through the toggle links 201 against the rear ends of the jaws 200 and cause the other ends of the jaws to swing towards each other. Thus the jaws will receive between them and clamp upon the free longitudinal edge portions of the members of the blow mold and will hold said members securely together so that they will not push apart when subjected to internal pressure. Immediately after the completion of the blowing operation the piston 203 will be moved outwardly and the clamping jaws disengaged from the blow mold, this action taking place just prior to the movement of the blow mold away from station III'.

*Delivery mechanism*

When the blow mold leaves station III' it moves to station IV' where the blown article will partly cool and will be given a chance to set. No mechanical action takes place at this station. The delivery of the blown article takes place at station V' (see Fig. 1ᵃ) and to effect this operation a novel form of mechanism has been provided. This mechanism includes a valve casing 208 (see Figs. 6 and 26) secured upon the fixed pull cam 177 at station V' and which casing has a central pressure inlet port 209 and spaced outlet ports 210 and 211. End ports 212 and 213 are provided in the casing and slidably mounted in this casing is a valve 214 having spaced annular grooves 215. A cylinder 216 is located preferably above the casing 208 and slidably mounted therein is a piston 217 having a stem 218 which projects beyond the outer end of the casing 216. A passage 219 extends longitudinally through the stem 218 and also through the piston and mounted on the outer end of the stem is a cylinder 220 having a port 221 which communicates constantly with the passage 219. Slidably mounted in the cylinder 220 is a piston 222 having an annular groove 223 which normally maintains communication between the port 221 and an outlet port 224. Another port 225 is provided at the bottom of cylinder 220. The stem 226 of the piston extends downwardly beyond the cylinder 220 and has a central bore 227 extending thereinto from its lower end. A port 228 is formed in the stem 226.

A cross head 229 (see Fig. 6) is carried by the stem 226 and works between two hangers 230 which have opposed slots 231. A longitudinal slot 232 is formed in the lower portion of the stem 226 and a connecting pin 233 is slidably mounted in this slot and in the slots 231 and passes through the center holes of arms 235 and acts as a pivot pin for these members while hooks 236 are opening and closing. A plunger 234 is slidably mounted in the bore 227 and bears on the pin 233. Crossed arms 235 are pivotally and slidably connected at their upper ends to the ends of the cross head 229 and attached to the lower end of each of these arms is a gripping fork 236, the two forks being extended toward each other. It is to be understood that when pressure is directed through the port 225 and against the bottom of the piston 222 pressure will immediately pass through the port 228 into the bore 227, thus causing the plunger 234 in bore 227 to hold pin 233 down tightly on bottom of slotted portion 231 in hangers 230 while piston 222 moves upward and closes the gripping forks about the article. At this stage of the operation the lower end of slot 232 has been raised and comes in contact with the pin 233 and the continued upward movement of the piston 222 raises said pin 233, arms 235, hooks 236 and the article of glass upward, this being permissible at this time because the members of the blow mold have been opened out during movement to this station V' in the manner hereinbefore pointed out.

The cylinder 220 is slidably mounted on a supporting rod 237 which projects outwardly beyond the blow table and is provided at its outer end with a valve casing 238. This valve casing has a pressure port 239 at one end and an intermediate outlet port 240. A valve 241 is slidably mounted in this casing and has an annular groove 242 communicating with a central bore 243. A stem 244 extends from the valve and toward the cylinder 220. Thus when the piston 222 has been fully raised the port 221 will be placed in communication with the port 225 with the result that air under pressure will flow along the bore in the piston stem 218 and back of the piston 217. Consequently said piston will be forced outwardly within its cylinder and the cylinder 220 will be brought forcibly against the stem 244. This will cause the valve 241 to shift so as to bring the pressure port 239 into communication with the outlet port 240 which will result in the transmission of pressure through port 212 against one end of the valve 214 thereby shifting the valve to reverse the direction of pressure in the cylinder 220 and cause the piston 222 to be lowered after which the gripping forks will be moved apart to release the article engaged thereby. After the delivery of the engaged article as described the piston 217 will be returned to its initial position by air pressure in the manner hereinafter described. Thus the delivery mechanism will be reset it being understood of course that the valve 241 will be automatically returned to its normal position when the cylinder 220 is removed therefrom, by the pressure against the large end of the valve. The lifting action of the delivery mechanism is desirable in order that the molded article may be lifted off of a mold bottom at station V'.

During the movement of the blow mold to and past station VI' the mold is allowed to cool and will be opened out as hereinbefore described.

*Conveyor mechanism*

Located adjacent station V' (see Fig. 1ᵃ) of the blow table is an endless conveyor belt which can be made of a chain or constructed in any other manner desired, this belt being indicated at 245, and having its upper flight supported by one or more rails 246.

Belt wheels which can be in the form of sprockets 247 and 248 (see Fig. 23) support this endless belt and fixedly connected to the side of one of the belt wheels is a ratchet wheel 249. An arm 250 is mounted to oscillate on the axis of the ratchet wheel and carries a pawl 251 which engages the ratchet wheel. Connected to the arm 250 is a rod 252 which is connected to a piston 253 mounted to slide within a cylinder 254, this cylinder being provided at its ends with ports 255 and 256 respectively. A stop screw 257 extends into one end of the cylinder and serves as a means for limiting the movement of the piston 253 and of pawl. The ports of the cylinder are so connected to the pressure system that at predetermined times during the operation of the machine the piston 153 will be shifted in one direction so as to cause the pawl 251 to rotate the ratchet wheel a sufficient distance to convey an article which has been deposited on the belt out of the way of the next article to be deposited on the belt. This actuation of the conveyor belt will occur immediately subsequent to the deposit and release of the blown article by the delivery mechanism. By means of the screw 257 the extent of movement of the belt can be adjusted for the accommodation of different diameters.

*Blow table controlling valves*

Fixedly mounted above the button 183 is a valve casing 258 (see Fig. 2ª) and slidably mounted in this casing is a poppet valve 259 (see Fig. 26) the stem of which projects downwardly into the path of the tapered button 183. This valve casing has a pressure port 261 and an outlet port 260, the two ports being normally out of communication. However, when the button is thrust outwardly so as to cause the blow mold to engage a blank delivery to station I′ the button will lift the poppet valve and establish communication between the pressure port and supply line J (Fig. 26) to supply air to throw valve 72 to admit air to cylinder 60 to open the neck rings. As shown in Fig. 1ª, the valve may be adjusted radially toward and away from the cylinder 178 so as to control the opening of the neck ring in timed relation to the closing of the blow molds. Advantageously, this valve is so adjusted as to permit of the opening of the neck rings just as or slightly prior to the final closing of the blow mold so that the blank or parison may be transferred to the blow mold.

Connected to the stand or pedestal 4 below the blow table at station I′ is a valve casing 262, (Fig. 2ª) this casing having opposed ports 263 and 264 (Fig. 26) which normally communicate through an annular groove 265 formed in a valve 266. A pressure port 267 is provided at one end of the valve casing. The valve projects from the other end of this casing and carries a roller 268 which is adapted to be successively engaged by a series of cams 269 on the hub portion of the blow table, one of these cams being provided for each blow mold. A longitudinal bore 270 extends into the valve 266 and has a radial port 271. Each time one of the cams 269 comes against the roller 268, the valve 266 will be pressed outwardly, thereby closing communication between the opposed ports 264 and bringing the port 271 in communication with one of the opposed ports so that pressure will be directed thereto from the port 267 for the purpose hereinafter pointed out.

Mounted adjacent the cylinder 178 is a valve casing 272 (Figs. 2ª and 26) having end ports 273 and 274, a central pressure port 275, spaced outlet ports 276 and 277 and exhaust ports 278 and 279. The outlet ports 276 and 277 are in communication with the end ports 179 and 180 respectively of the cylinder 178. A valve 280 is slidably mounted in the casing 272 and is provided with spaced reduced portions extending annually therein. These reduced portions are so proportioned that when the valve 280 is shifted to the left the port 277 is placed in communication with the exhaust port 279 while the pressure port 275 is placed in communication with the outlet port 276. When pressure is directed against the other end of the valve it will be shifted so as to reverse the direction of pressure past the valve and into the cylinder 178.

*Operating mechanism*

Each of the tables 3 and 5 has a gear formed on or secured to the periphery thereof, the two gears being indicated at 281 (Figs. 2 and 2ª). Both gears constantly mesh with an intermediate gear 282 (Figs. 2 and 2ª) arranged between the two tables at stations III and I′. The gear 282 is keyed or otherwise secured to the upper end of a shaft 283 which is journaled at its lower end in a bearing 284 on the base 1. The lower portion of the shaft is arranged in a housing 285 on the base and mounted to reciprocate within this housing is a rack bar 286 the free end of which is beveled at the top as shown at 287 (see Fig. 25).

A gear 288 is feathered on the shaft 283 and is coupled as at 289 to a sleeve 290 mounted to slide on the upper portion of the shaft and guided within the housing 285.

The upper portion of the housing is formed with a cylinder 291 in which a piston 292 is adapted to reciprocate. This cylinder has a port 293 at its upper end and another port 294 at its lower end. These two ports are connected to the pressure system as hereinafter pointed out.

Connected to the upper end of the sleeve 290 is a cross head 295 designed to move upwardly and downwardly with the sleeve when actuated by the piston and attached to the outer ends of this cross head are combined bolts and valves 296 and 297 which are slidably mounted within bores 298 and 299 respectively in outstanding arms 300 which constitute bearings for the gears 282. These outstanding arms are connected to the housing 285 by means of standards 301. The combined bolt and valve 296 has an annular groove 302 and a similar groove 303 is formed in the combined bolt and valve 297. Opposed ports 304 are formed in the outstanding arm at opposite portions of the bore 298 and opposed ports 305 open into the bore 299. Thus when the combined bolts and valves are moved upwardly and downwardly they will momentarily establish communication between the ports 304 and between the ports 305 respectively. When the bolts are moved upwardly, which action takes place as soon as the two tables come to a stop, they will enter openings formed in the peripheral portions of the tables so as to lock the tables against movement. These openings are so located that each time one of the blank molds is brought to station III and one of the blow molds is brought to station I' certain of the openings will be in position to receive, and will receive the bolts.

The rack bar 286 is connected to or formed with the stem 307 of a piston 308 (see Figs. 1 and 25). This piston is designed to reciprocate within a cylinder 309 (Fig. 1) mounted on the base 1 between the stations II and II'. Back of the cylinder is arranged a supplemental valve casing 310 (Fig. 25) having a pressure port 311 at its back end while at the side of this supplemental valve casing are provided spaced outlet ports 312 and 313 and an exhaust port 314. A valve 315 is slidably mounted in the supplemental casing 310 and has an annular groove 316 in communication with a longitudinal bore extending into the valve from the pressure end thereof. A stem 317 projects from the valve and into the cylinder 309 so that when the piston 308 is moved backward it will strike the stem and shift the valve 315 to establish pressure between the port 311 and 312 and to open the exhaust 314. The actuation of the valve stem 317 at the end of the idle stroke of the piston 308 moves the valve 315 to first cut off the air in line D leading to the blow heads 98 and 149 and then to admit air to line E to release the various blow heads and baffle plate from the molds. Thus the valve 315 acts as a safety valve to insure that the blowing air is cut off prior to the unclamping of the molds. Under normal conditions communication is established between the port 311, groove 316 and port 313.

Arranged adjacent the cylinder 309 is a valve casing 318 having an intermediate pressure port 319, end ports 320 and 321 and spaced outlet ports 322 and 323. A valve 324 is mounted for reciprocation in this casing and has spaced reduced portions so that when pressure is directed from port 320 against the valve the pressure port 319 will be placed in communication with outlet port 322, and when the valve is shifted in the opposite direction pressure will be directed from port 319 to 323. The port 322 is in communication with a back port 325 in the cylinder 309 while the port 323 is in communication with a front port 326 in said cylinder 309.

The beveled end 287 of the rack bar is adapted, when said rack bar is shifted forwardly by the piston 308 to move under and lift a poppet valve 326', thus to establish communication between a pressure port 327 and an outlet port 328 in the casing 329 of the valve.

Mounted on the base 1 between stations I and II is the casing 329' of a controlling valve 330. This casing has end ports 331 and 332, an intermediate pressure port 333 and spaced outlet ports 334 and 335. Thus when pressure is directed against one end of the valve 330 from port 332 the pressure port 333 will be placed in communication with outlet port 335 and, when the motion of the valve is reversed the pressure port 333 will be placed in communication with outlet port 334.

Pressure system

The various pistons, valves, blow heads, etc., are adapted to be supplied with air under pressure from a pressure supply pipe M which, in the diagram drawings, has been indicated by heavy lines. By referring to the diagrams (Figs. 25 and 26) it will be seen that this pressure line M extends to one of the ports of the punty valve 140, to the port 90 of the valve casing 82, to the plunger 132, to port 125 of casing 124, to inlet to valve casing 120, to port 25 in casing 21, to port 65 in casing 64, to port 327 in casing 329, to the port 333 in valve casing 329', to port 319 in valve casing 318, and to port 311 in valve casing 310. The main supply line then extends to certain of the apparatus on and adjacent the blow table and communicates with the port 267 in casing 262, with port 261 in valve casing 258, with port 275 in valve casing 272, with the blow head 192, with the port 239 in valve casing 238 and with port 209 in valve casing 208. This pressure is constant in the various valve casings mentioned and where it comes against the end of a valve, it holds said valve normally unseated from the outlet port as shown, for example, at casing 21, casing 310, casing 262, and casing 238. Constant pressure is maintained in the plunger 132 and blow head 192 but, obviously, is not released therefrom until this blow head is shifted out of its normal position as has hereinbefore been described.

In addition to the pressure line M there are various other pressure lines which are designed during certain stages of the operation to direct pressure against certain parts of the apparatus from the pressure line M, thereby to produce the various operations in accurately timed succession.

A line A connects the upper end of the cylinder 220 with the port 210 in valve casing 208.

Line N connects the port 225 in the bottom of cylinder 220 with the port 211 in casing 208.

Another line K connects the port 240' in casing 238 with the port 212 in casing 208.

A line H extends from the port 205 in cylinder 204, and from port 188 in cylinder 187, to the port 294 of cylinder 291, to the port 138 of cylinder 129, to the port 145 of the cylinder 144, to port 163 of cylinder 161, to port 335 of valve casing 329', and to one of the ports 305 of bolt valve 297.

Another line H' extends from the other port 305 to port 213 in casing 208.

Another supplemental pressure line P extends from the port 256 in cylinder 254 and thence to port 325 in cylinder 309 and to port 322 in valve casing 318.

A line F communicates with the port 189 in cylinder 187 and with the port 206 in cylinder 204, and this line extends to the blank table and communicates with the port 164 in cylinder 161, with port 146 in cylinder 144, with the port in the top of cylinder 129, with the port 293 in cylinder 291, with the ports 304 intersected by the bolt valve 296, with the port 320 in the valve casing 318, and with the port 334 in the valve casing 329.

Another supplemental pressure line has been indicated at O, this line opening into the port 255 in cylinder 254, in port 326 in cylinder 309, and in port 323 in valve casing 318.

Another supplemental pressure line has been indicated at L, this line opening into port 273 of valve casing 272, port 263 in valve casing 262, port 75 in valve casing 64, and to a port in the outer end of cylinder 216.

Another supplemental pressure line has been indicated at J, and extends from the port 260 in valve casing 258 to port 74 in valve casing 64.

A supplemental line I maintains communication between port 274 in casing 272 and port 27 in casing 21.

A supplemental pressure line C leads from the port 121 of valve casing 120 and communicates with the port 126 in valve casing 124 with one of the end ports in valve casing 82, and with the port 321 in valve casing 318.

A short supplemental pressure line B connects the punty valve 140 with the port 122 in valve casing 120.

A supplemental pressure line D opens in the blow head 98, the blow head 148 and the port 313 of valve casing 310. Another line E extends from the port 312 in valve casing 310 and opens into the port 331 in valve casing 329' and into the other end port in the valve casing 82.

An additional supplemental pressure line has been indicated at G and extends from the port 328 in valve casing 329 to the port 332 in valve casing 329'.

General operation

The operation of the various units of the apparatus has already been described, but in addition thereto the general operation of the machine might be described as follows:

With all parts in normal position, a charge of molten glass is deposited in the blank mold at station I and the punty valve is depressed by the gatherer, if the machine is fed by hand, which allows air, under pressure, to pass from line M to line B which leads to the end of valve casing 120. This moves the valve therein to position to admit air to the front of piston 116 of cylinder 117, which action closes the shear blades as already described. When piston 116 reaches the end of its backward stroke groove 127 of stem 115 is brought into register with port 125 in the casing 124. This passes air from supply line M to outlet line C leading to end of valve casing 120 and causes this valve to move to position to pass air to the rear of piston 116 in cylinder 117, which opens the shear blades.

If the feeding is accomplished automatically, the shears and punty trip are unnecessary, and the cycle of operations is started by admitting air to line C by means controlled by the feeding device. Line C leads to end of valve casing 82 which moves the valve therein to position to admit air to the top of piston 81 in cylinder 80. This causes the piston to move downward, carrying head 92 downward, causing the blow head to swing directly over and down on to the blank mold as already described.

Line C also leads to the end of valve casing 318 causing the valve therein to move to position to admit air to the front of piston to move it backward within cylinder 309. The backward motion of piston 308 can be controlled by throttling the exhaust therefrom. This backward stroke of piston 308 is employed as a timing means and regulates the length of time air pressure is permitted to remain on the glass within the blank mold at station I. This timing is accomplished in the following manner:

In normal position, constant air pressure at the rear of valve casing 310 holds valve 315 forward so that its stem projects into cylinder 309. With valve 315 in this position, air passes out of port 313 and through line D to blow heads 148 and 98, which, however do not blow until pressed tightly against their respective molds. When piston 308 on its backward stroke, reaches projecting stem of valve 315, this valve is caused to move backward, which action closes port 313 and cuts off air to line D thereby cutting off air supply to blow heads 148 and 98 and placing this line in exhaust from port 314. The further backward motion of valve 315 brings air to register with outlet port 312 supplying line E with air which line E leads to end of valve casing 82 causing the valve therein to move to position admitting air through ports 90 and 84, to the bottom of piston 81 of cylinder 80. This causes this piston to move upward and raise blow head 98 which swings upward and back to normal position.

Line E also leads to end of valve casing 329, moving the valve therein to position admitting air from supply line M to outlet line F which line F admits air to top of piston 130 of cylinder 129, causing this piston to descend and withdraw the neck pin or plunger from the molten glass in the blank mold at station I.

Line F supplies air to top of piston 147 of cylinder 144 which causes this piston 147 to move downward, withdrawing blow head 148 away from the blank mold at station II. This line F also supplies air to the under side of piston 160 of cylinder 161, causing piston 160 to move upward and raise the baffle plate 158 free of the mold at station II.

The line F likewise supplies air to the underside of piston 190 in cylinder 187, causing the piston to raise the blow mold blow head 192 free of the mold and finished mouth at station III'. The same line, F, supplies air to the front of piston 203 of cylinder 204, causing the piston to move backward and open the clamping jaws 200 and release the blow mold at station III'. Air is supplied to the top of piston 292 of cylinder 291 by line F, causing piston 292 to move downward which action shifts the gear 288 into mesh with rack 286 and causes the bolt valves 296 and 297 to pull out of the holes provided therefor in the tables. Both tables are then ready to be advanced one step or station. It will be noted that all pistons operated by action of air through line F are moved simultaneously except the downward motion of piston 292 in cylinder 291, which action is preferably controlled or delayed by throttling the exhaust from beneath this piston. With register pin 296 in lowered position, groove 302 is in register with ports 304 and air from line F is permitted to pass to the end of valve casing 318, which causes the valve therein to move so as to admit air to the rear of piston 308 of cylinder 309, which moves piston 308 forward. The forward movement of said piston carries forward the rack 286 which is in mesh with the shiftable gear 288.

During the movement of the tables the roller 268 on the outer portion of valve 266 in casing 262 comes in contact with cam 269 on the hub of the blow mold table 5, which causes valve 266 to move backward bringing port 271 into register with outlet port 263, and allowing air to pass from supply line M to the line L which leads from port 263 to the end of valve casing 272. The valve 280 is thus moved to position to admit air to the front of piston 181 in cylinder 178 and cause the tapered push button 183 to return to normal position. This permits the poppet valve 259 in casing 258 to close and cut off air from supply line M to line J. Line L leads to the end of valve casing 64 so as to move the valve therein to position to admit air from supply line M to the rear of piston 61 of cylinder 60 which causes spool 63 to move to forward position. Line L leads to front of piston 217 of cylinder 216 causing piston 217 to move back within its cylinder and move the taking out mechanism back. This is permitted by exhausting through passage 219 in piston rod 218, which exhaust passes around grooved portion of piston 222 and escapes to the atmosphere by way of vent 224 in the side of cylinder 220. The returning of piston 217 of cylinder 216 and the backward movement of cylinder 220 permits air in the rear of valve 241 in casing 238 to force said valve 241 forward. This cuts off register of groove 240 of the valve with outlet port 240', thereby cutting off the air supply of line K.

When the blank mold containing the charge of glass has been moved from first or filling station I to station II, the turning rack 286 and piston 308 have reached the end of their forward stroke. This brings the beveled end of the rack in contact with the projection of the valve 326' in casing 329, which lifts the valve so as to admit air from supply line M to outlet line G which leads to one end of valve casing 329' and moves the valve therein so as to supply air from supply line M to outlet line H. Line H operates to raise piston 130 of cylinder 129 which moves the neck pin or plunger 133 upward within the neck ring of the blank mold at station I, which mold is then prepared to receive another charge of molten glass.

Line H operates to raise piston 147 in cylinder 144 to position the blow head 148 tightly against the neck ring of the blank mold at station II. This line H also acts to lower piston 160 of cylinder 161 which action carries baffle plate 158 downward and tightly holds the same upon the top of the blank mold at station II. The upward movement of blow head 148 which is now tightly pressed against the neck ring opens the valve therein as hereinbefore described. Line H also directs air against piston 203 which closes the clamping jaws 200, as described. The same line also directs air to piston 190 in cylinder 187 which action lowers blow head 192 at station III' and brings asbestos washer 199 to sealing position and completes the blowing operation as before pointed out. Air is directed from line H against piston 292 (see Fig. 25) which shifts the gear 288 upward and out of mesh with rack 286 and also acts to raise the bolt valves 296 and 297 and lock the tables. The upward movement of valve bolt 297 causes groove 303 to pass outlet port 305 thereby allowing air to pass from the said line H to end of valve casing 208 (see Fig. 26) which moves the valve therein to position allowing air to pass from supply line M to outlet line N leading to underside of piston 222 (see Fig. 6), thereby moving the piston upward in cylinder 220. The air thus entering the cylinder 220 also and at the same time operates the plunger 234 and the gripping forks as already described.

At the point where piston 222 has passed and uncovered port 221 which extends through the wall of cylinder 220, air passes through piston rod 218 and is admitted to rear of piston 217 in cylinder 216 causing said piston to move forward in its cylinder 216. Air will exhaust through line L to groove 265 in valve 266. When the taking out mechanism has carried the glass article to the position directly over the conveyor, as heretofore described, the cylinder 220 comes in contact with the projecting stem of valve 241 which registers groove 240 with the outlet port 240' of valve casing 238, and permits air to pass from supply line M to outlet line K (see Fig. 26) leading to valve casing 208. This moves the valve therein to position to admit air from supply line M to outlet line A which operates to move piston 222 downward in cylinder 220, which action lowers the glass article to the conveyor and opens the gripping jaws. At this stage of operation the delivering mechanism remains at rest.

The air time on piston 253 of the conveyor mechanism is the same as the air time on piston 308 of cylinder 309. Therefore when air enters cylinder 309 at the rear of piston 308 to cause the tables to turn, air also enters cylinder 254 through line P at the rear of piston 253, causing the conveyor to move forward. Likewise, when air enters cylinder 309 at the front of piston 308 causing this piston to move back, air also enters cylinder 254 through line O in front of piston 253, causing this piston to move back. Thus it will be seen that when an article is deposited upon the conveyor by the taking out mechanism, the action of the conveyor moving forward carries the extended neck portion of the article out of the path of the delivery mechanism.

The successive operations produced by the rotation of the blank table relative to its stand or pedestal have already been described, air under pressure being supplied constantly to the various pressure passages in the stand or pedestal. The series of blank molds are so disposed relative to each other that when a blank mold is moved from station II to station III, a blow mold is moved from station VI' to I'. Each time one movement is imparted to the blank table, a corresponding movement is imparted to the blow table, because the two tables receive motion from the same interposed gear.

It might be stated in further explanation of the operation of the machine that immediately preceding the arrival of the blank mold at station III, the plunger 39 is caused to move in cylinder 33 by coming in contact with the cam extending from the side of the valve casing 21. This insures the plunger 39 passing into position directly in front of the valve 22 so that when piston 49 moves back in cylinder 33 piston 49 will come into contact with the plunger 39 and force said plunger to move the valve back in casing 21, thereby allowing air to pass from supply line M to outlet line I. This line I leads to the end of valve casing 272 so that when air is directed against the valve 280 from line I said valve will be shifted so that air will be supplied from line M to the rear of piston 181 in cylinder 178. The forward movement of this piston carries forward the button 183 which comes in contact with the roller 173 and causes the blow mold at station I' to close around the glass blank which, as before described, is held suspended at this position from the neck ring located at station III. Just before the blow mold has closed tightly around the glass blank the button 183 raises the valve 259 so that air is permitted to pass from the line M to the line J which leads to the end of the valve casing 64. Therefore the valve 72 in said casing will be moved so as to allow air to pass from the line M to the front of piston 61 in cylinder 60, causing this piston to move back and carry the spool 63 which operates to open the jaws of the neck ring, thereby releasing the glass blank.

It will be seen from the foregoing that the entire operation of the machine is automatic, the control being effected by the actuation of the punty valve in the machine illustrated.

The apparatus may be mounted on wheels 336 so as to be conveniently moved from place to place.

Although we have described our invention with reference to the specific construction of the machine, we do not intend all of the features thereof to be so restricted as they are useful and novel in other types of machines. Also the term "station" and "position" as used herein, and in the claims, is intended to include a moving position as well as a fixed position, these terms being intended to define the position or region wherein certain operations take place, whether at rest or while moving, the two being recognized equivalents in the art.

The "stop station devices" referred to in some of the claims includes such devices mounted at certain stations or positions of rest and adapted to cooperate with the molds, as for example, in the illustrated embodiment, the compacting blow head, the mouth pin mechanism, the baffle plate mechanism, the counter blow head, the final blow head and the mold clamps.

What is claimed is:

1. In a glass blowing machine, the combination of a blank table and a blank mold carried thereby, a blow table at one side of and on the same level with the blank table, a blow mold upon the blow table, said tables being spaced apart horizontally and having their adjoining portions movable in opposite directions respectively, means for opening the blank mold at a predetermined position, means for suspending the blank when released from the blank mold at the same elevation at which it was held by the blank mold, means for positioning the blow mold about the suspended blank and means for releasing the blank from its supporting means, said blank supporting means and blow mold being movable toward said predetermined position from opposite directions respectively, and means for adjustably timing the releasing of the blank supporting means with relation to the positioning of the blow mold around the blank.

2. In a glass blowing machine, the combination with a blank table of a blow table, and blank molds and blow molds upon the respective tables, and a gear interposed between and adapted to drive the tables, a reciprocating actuating element, a shiftable gear revoluble with the interposed gear and adapted to mesh with the drive element, and means controlled synchronously with the placing of a gather in one of the blank molds for successively moving the actuating element to rotate the gears, disengaging the shiftable gear from said element and returning said actuating element to its initial position.

3. In a glass blowing machine, a blank table and a blow table mounted for rotation, gears carried by said tables, blank molds and blow molds upon the respective tables, an interposed gear meshing with the gears on the two tables, a shiftable gear revoluble with the interposed gear, a rack adapted to mesh with the shiftable gear, and means controlled synchronously with the placing of a gather in one of the blank molds for successively shifting the actuating element to rotate the gears, moving the shiftable gear out of mesh with said element, returning said element to its normal position, and returning the shiftable gear into mesh with said element.

4. In a glass blowing machine, the combination with revoluble blank and blow tables, and blank and blow molds upon the respective tables, of an interposed gear for simultaneously rotating the tables, an actuating element, a shiftable gear revoluble with the interposed gear and normally meshing with the actuating element, means controlled synchronously with the placing of a gather in one of the blank molds for moving the actuating element to rotate the gears and tables, for moving the shiftable gear out of engagement with the actuating element, for returning the actuating element to its initial position, and for moving the shiftable gear back into engagement with the actuating element, and means shiftable with the shiftable gear for locking and unlocking the tables.

5. In a glass blowing machine, the combination with a blank mold, a sectional neck ring combined therewith, and a blow mold, each of said molds being movable successively to separate stations, one of the stations of the blow mold being the same as one of the stations of the blank mold, and constituting a transfer station, of means for automatically opening the blank mold upon approaching the transfer station, means for opening the blow mold before approaching the transfer station, means for automatically closing and centering the open blow mold upon arriving at the transfer station, and pneumatically operated means controlled by the closing movement of the blow mold for shifting the sections of the neck ring out of engagement with the blank.

6. In a glass blowing machine, the combination with simultaneously movable blank and blow molds, both molds having a common or transfer station, and a sectional neck ring combined with the blank mold, of means for automatically opening the blank mold when approaching the transfer station to disengage from the blank in the mold, means for automatically opening the blow mold before approaching the transfer station, pneumatically operated means for automatically centering the open blow mold on arriving at the transfer station, means for automatically closing the blow mold upon completing said centering movement to embrace the released blank, and means operated automatically after the closing and centering movement of the blow mold for pneumatically operating the neck ring to disengage said ring from the blank prior to the final engagement of the blank by the blow mold.

7. In a glass blowing machine, the combination with a blank mold movable successively to separate stations, of a blow head, a pressure supply line in communication with the blow head, a punty valve, means under the control of the punty valve for lowering the blow head, means for guiding the blow head laterally and downwardly to the blank mold during such downward movement, and means for automatically releasing pressure from the blow head when brought in contact with the blank mold.

8. In a glassware machine comprising a plurality of mold carriers movable in cyclical paths intersecting at a transfer point, axially divided molds supported by said carriers with their axes coinciding at the transfer point, the parts of said molds being hinged to separate on opposite sides at the transfer point, and said mold carriers being moved towards and away from said point in synchronism, means associated with one of said molds for embracing the neck of ware held therein, means to open said last mentioned mold to expose the ware therein at the transfer point, oppositely disposed cylinders at said transfer point operating automatically and successively to close the opposite mold to embrace the ware and open said neck embracing means, means controlled by mold movement for operating said cylinders, and means beyond the transfer station for blowing the bottle to finished form.

9. In a glassware machine comprising a plurality of mold carriers movable in cyclical paths intersecting at a transfer point, axially divided molds supported by said carriers with their axes coinciding at the transfer point, the parts of said molds being hinged to separate on opposite sides at the transfer point, and said mold carriers being moved towards and away from said point in synchronism, means associated with one of said molds for supporting the ware held therein when the mold is opened, and oppositely disposed cylinders cooperating automatically at said transfer point to open said last mentioned mold to expose the ware therein upon arriving at the transfer point, and thereupon to close the opposite mold to embrace the ware, and connections for operating a cylinder for closing the latter mold controlled by the opening of the other mold.

10. In a glassware machine comprising a plurality of mold carriers movable in cyclical paths intersecting at a transfer point, axially divided molds supported by said carriers with their axes coinciding at the transfer point, the parts of said molds being hinged to separate on opposite sides at the transfer point, and said mold carriers being moved towards and away from said point in synchronism, means associated with one of said molds for embracing the neck of ware held therein, and means operating automatically to open said last mentioned mold to expose the ware therein upon arriving at the transfer point, means operating to close the opposite mold to embrace the ware and open said neck embracing means to release the ware, adjustable means for variably timing the opening of the neck embracing means with relation to the closing of the blow mold and means beyond the transfer station for blowing the bottle to finished form.

11. In a glassware machine comprising a plurality of mold carriers movable in cyclical paths intersecting at a transfer point, axially divided molds supported by said carriers with their axes coinciding at the transfer point, the parts of said molds being hinged to separate on opposite sides at the transfer point, and fluid pressure means for moving said mold carriers towards and away from said point in timed relation, means associated with one of said molds for embracing the neck of ware held therein, and fluid pressure means to open said last mentioned mold to expose the ware therein upon arriving at the transfer point, and means operating successively to close the opposite mold to embrace the ware and open said neck embracing means to release the ware prior to the final closing of the blow mold into the resumption of movement of said mold carrier, and means beyond the transfer station for blowing the bottle to finished form.

12. In a glassware machine comprising a plurality of mold carriers movable in cyclical paths intersecting at a transfer point, axially divided molds supported by said carriers with their axes coinciding at the transfer point, the parts of said molds being hinged to separate on opposite sides at the transfer point, and said mold carriers being moved towards and away from said point in synchronism, means associated with one of said molds for embracing the neck of ware held thereon, and means operating successively to open said last mentioned mold upon arriving at the transfer point to expose the ware therein, close the opposite mold to embrace the ware and open said neck embracing means to release the ware, said successively operating means being actuated by fluid pressure cylinders supplied through valves opened each upon substantial completion of movement of the preceding operation, and means beyond the transfer station for blowing the bottle to finished form.

13. In a glassware machine comprising two mold supporting means rotatable in unison, divided molds carried thereby in intersecting paths, said molds being closable about a common axis at the point of intersection of said paths, fluid pressure cylinder actuated means for opening and closing said molds arranged adjacent said point of intersection, control valves for operating said cylinders automatically in succession, and connections for said valves to insure that one of said molds is closed only after the opposite mold is opened.

14. In a glassware machine comprising two mold supporting means rotatable in unison, divided molds carried thereby in intersecting paths, divided neck rings associated with the molds carried by one of said supporting means for opening independently thereof, said molds and neck rings being closable about a common axis at the point of intersection of said paths, fluid pressure cylinder actuated means for opening and closing said molds and neck rings, control means for said cylinders, and adjustments for said control means to insure that one of said molds is closed only after the opposite mold is opened.

15. In a glassware machine, a rotatable mold carrier, forming molds mounted thereon, neck ring sections associated therewith, a second rotatable mold carrier, finishing molds mounted thereon, means for rotating said carriers in synchronism, fluid pressure operated means for successively disengaging said forming molds from the ware while suspended from said neck ring sections and engaging said finishing molds therewith, and means controlled by said fluid pressure operated means for disengaging said neck ring sections from the ware.

16. In a glassware machine, a rotatable mold carrier, forming molds mounted thereon, neck ring sections associated therewith, a second rotatable mold carrier, finishing molds mounted thereon, means for rotating said carriers in synchronism, fluid pressure operated means for successively disengaging said forming molds from the ware while suspended from said neck ring sections and engaging said finishing molds therewith, and means controlled by said fluid pressure operated means for disengaging said neck ring sections from the ware, in combination with means for preventing rotation of said mold carriers during the period of operation of said fluid pressure operated means.

17. In a glassware machine, a rotatable mold carrier, forming molds mounted thereon, neck ring sections associated therewith, a second rotatable mold carrier, finishing molds mounted thereon, means for rotating said carriers in synchronism, fluid pressure operated means for successively disengaging said forming molds from the ware while suspended from said neck ring sections and engaging said finishing molds therewith, means actuated by rotation of said carriers for controlling the operation of said fluid pressure operated means, and means controlled by said fluid pressure operated means for disengaging said neck ring sections from the ware.

18. In a glassware machine, a rotatable mold carrier, invertible forming molds rotatably mounted thereon, neck rings associated with said forming molds, a plunger cooperating with said molds and neck rings to form the mouth finish, a second rotatable mold carrier, laterally spaced from said first mold carrier, finishing molds mounted thereon, means for rotating said carriers in synchronism, means controlled by said carrier rotating means for withdrawing said plunger from operative position, means for disengaging said forming molds from the ware, and engaging said finishing molds directly therewith, said mold engaging and disengaging means being controlled by said carrier rotating means for disengaging the ware from said forming molds, and engaging it with said finishing molds upon completion of each turning movement.

19. In a glassware forming machine, the combination of separate blank and blow mold carriers adapted to be intermittently moved to present their respective molds to successive operative stations, blank forming means and blowing means operatively associated with said blank and blow molds respectively during periods of rest of said carriers, reciprocable pneumatically actuated carrier advancing mechanism for intermittently moving said carriers, a power control valve actuated directly by said carrier advancing means, and a pneumatically actuated reciprocable member for locking said carriers against rotation and unclutching said carrier advancing means from said carriers, respectively, at the end of the power stroke of said carrier advancing means and during the idle stroke thereof, and for unlocking said carriers and clutching said advancing mechanism and carriers at the end of the idle stroke and during the power stroke of said advancing means.

20. In a glassware forming machine, the combination of separate blank and blow mold carriers adapted to be intermittently moved to present their respective molds to successive stations, respectively, pneumatically actuated blank forming mechanism adapted to be brought into engagement with a blank mold during periods of rest of the blank mold carrier, to form the blank or parison, pneumatically actuated blowing mechanism adapted to be brought into engagement with a blow mold during a period of rest of the blow mold carrier to blow the article to finished size, gearing between said carriers and operatively connected thereto to drive said carriers in unison, reciprocable pneumatically actuated carrier advancing mechanism operative upon said gearing for intermittently moving said carriers, a pneumatically actuated reciprocable member for locking said carriers against rotation and unclutching said carrier advancing mechanism from said carriers, a power control valve actuated directly by said carrier advancing means to lock the carriers, unclutch the carrier advancing means, move the control blank forming and article blowing mechanism into engagement with the blank and blow molds, respectively, at the end of the power stroke and during the idle stroke of the carrier advancing mechanism and to reset said means and mechanism at the end of the idle stroke and during the power stroke thereof.

21. In a glassware forming machine, the combination of blank molds and blow molds mounted on separate carriers and successively movable toward and from a transfer position, neck rings mounted on one of said carriers and adapted to be associated with said blank molds during the forming of the blanks and for supporting the blanks at the transfer position, mechanism for automatically disengaging the blank molds from the blanks whereby to suspend successive blanks in the neck rings, mechanism for automatically closing the blow molds around a suspended blank, mechanism for automatically opening the neck rings to release the blank after it has been surrounded by the blow molds, separate fluid pressure cylinders for actuating each of said mechanisms, means for rotating said carriers, means controlled by the rotation of the carriers to regulate the flow of air to the cylinder for disengaging the blank molds, means operable after the disengagement of a blank mold for admitting fluid pressure to the cylinder for closing the corresponding blow mold, said blow mold closing mechanism being operable near completion of its movement to regulate the flow of fluid pressure to said cylinder for opening said neck rings.

22. In an automatic glassware forming machine, the combination of separable blank and blow molds movable as a whole in different paths intersecting at a common operating position, means for moving said molds simultaneously to successive operating positions, separable neck rings associated with said blank molds in the blank forming positions, means for opening the blank mold thereby to support the blank on the neck rings at said common position, fluid pressure means to close the blow mold around the suspended blank, valve means controlled by and operable upon the completion of movement of said blank mold opening means for admitting fluid pressure to said blow mold closing means, and means to disengage the neck ring from the blank enclosed by the blow molds, all of said means being set in motion automatically in the order named.

23. In a glassware forming machine, the combination of separable blank and blow molds movable in separate paths to successive operating positions and intersecting at a common point, neck rings associated with said blank molds during the forming of the blank, means for opening said blank mold to support the blank wholly by the neck mold, means for closing a blow mold around the suspended blank, and means controlled by said blow mold closing means for releasing said neck rings.

24. In a glassware forming machine, the combination of separable blank and blow molds movable in separate paths to successive operating positions and intersecting at a common point, neck rings associated with said blank molds during the forming of the blank, means for opening said blank mold to support the blank wholly by the neck mold, means for closing a blow mold around the suspended blank, fluid pressure means operable to open said neck rings and valve means controlled by the movement of said blow mold closing means for admitting fluid pressure to said neck ring opening means.

25. In a glassware forming machine, the combination of separable blank and blow molds movable in separate paths to successive operating positions and intersecting at a common point, neck rings associated with said blank molds during the forming of the blank, means for opening said blank mold to support the blank wholly by the neck mold, means for closing a blow mold around the suspended blank, fluid pressure means operable to open said neck rings, and a valve adjustably mounted at said blow mold closing means and arranged to be controlled by movement thereof for admitting pressure to said neck ring opening means whereby to regulate the opening of the neck rings in timed relation to the closing of the blow mold in accordance with the type of ware being produced.

26. In a glassware forming machine, having blank molds and separable blow molds, and neck rings associated with said blank molds during the forming of the blank, the combination of means for effecting the transfer of the blank from a blank mold to a blow mold comprising means for disengaging the blank mold from the blank whereby to support the blank by the neck rings, means operable following the operation of said blank mold disengaging means for closing the blow mold around the suspended blank, means to open the neck rings as the blow molds close around the suspended blank and means to adjust the time of opening of the neck rings in relation to the closing of the blow molds in accordance with the type of ware being produced.

27. In a glassware forming machine having blank molds and separable blow molds, and neck rings associated with said blank molds during the forming of the blank, the combination of pneumatic means for effecting the transfer of the blank from a blank mold to a blow mold comprising means for disengaging the blank mold from the blank whereby to support the blank by the neck rings, fluid pressure means operable upon the completion of the operation of said blank mold opening means for closing the blow mold around the suspended blank, fluid pressure means operable to open the neck rings, and valve means for admitting pressure to said last named means, and controlled by the movement of said blow mold closing means to regulate and vary the opening of the neck rings in timed relation to the closing of the blow mold in accordance with the type of ware being produced.

28. In an automatic glassware forming machine, the combination of a rotatable mold carrier having invertible blank molds and neck molds thereon, means for intermittently moving said carrier to present said blank molds to successive operating stations including charging, blank forming and transfer stations, separable blow molds movable intermittently to separate stations including transfer, blowing and discharge stations, means for positioning the blank and neck mold with the neck mold lowermost at the charging station to receive a charge of glass and while at said station to form the neck and mouth finish of the blank, means operable thereafter to admit air to the blank thereby to elongate it, means to invert the blank, co-ordinated means successively operable to disengage the blank mold from the blank thereby to permit it to be supported from the neck, to position and close a blow mold around the suspended blank, and to release the supporting means whereby to transfer it completely to the blow mold, means for blowing the article to finished form at the blowing station while supported exclusively in the blow mold, and means for opening said blow molds at said discharge station, all of said means being operable automatically and coordinated with said mold moving means to operate in the order named.

29. An automatic glassware making machine having a plurality of sets of cooperating blank molds and blow molds and means for transferring the blanks successively from the respective blank molds to the corresponding blow molds comprising a pair of neck rings associated with each of the respective blank molds in inverted position to form the blanks with the neck down, means for opening the blank molds while the blanks are sustained by the neck rings, means for positioning the blanks in the blow molds and means for opening the neck rings as the blow molds close around the suspended blank and to discharge the blanks into the blow molds prior to the blowing of the bottle to finished shape, whereby each pair of neck rings serves also as the transfer means between its blank mold and corresponding blow mold.

30. Transfer mechanism for use in an automatic glassware forming machine adapted to transfer glass parisons from a blank mold to a sectional blow mold, comprising means for engaging the parison by the neck finish while enclosed in said blank mold, means for disengaging the blank mold from the parison, whereby to support it by said neck finish engaging means, for positioning the parison thus supported within the blow mold preparatory to final blowing of the parison, means for closing the blow mold sections together to embrace the supported parison and for disengaging said neck finish engaging means from said parison as the blow mold closes around it before said blowing operation, and connections for automatically operating said means in timed relation to each other and in synchronism with the forming operations of said machine.

31. Transfer mechanism for automatic glassware forming machines adapted to transfer glass parisons from a blank mold to a sectional blow mold, comprising neck rings adapted to engage the neck finish of the parison, means for disengaging the blank mold from the parison whereby to support it in said neck rings, means to move said blow mold sections toward each other around said parison while supported in said neck rings preparatory to the final blowing operation and means for disengaging said neck rings from said parison as the blow molds closes around it and before the blowing operation, and connections for insuring the sequence of operation of said means in the order named.

32. A transfer mechanism for automatic glassware forming machines adapted to transfer glass parisons from movable blank and blow molds, comprising means adapted to embrace and grip the neck of the parison and support it in a fixed position during a period of rest of said molds while permitting the disengaging of the blank mold therefrom and the engagement of a blow mold therewith in combination with means for blowing the articles to final form in the blow mold, and adjustable means for disengaging said supporting and gripping means from the parison prior to movement of the blow mold from said position of rest, and prior to the blowing of the bottle to finished form.

33. In a glassware forming machine having divided blank and blow molds and automatic means for opening and closing them, means for moving said molds toward and from a transfer station, means for embracing the neck finish of the blank to support it in a fixed position during a period of rest of said molds, means for opening the blank mold to disengage it from the blank, and means for closing the blow mold around the blank while supported in said neck finish embracing means in combination with means for blowing the article to final form in the blow molds, means for disengaging said neck embracing means prior to the final blowing of the ware in the blow mold, and adjustable connections for insuring the operation of said means in the order named.

34. Glassware forming apparatus comprising a first rotatable carrier provided with a radially disposed bearing, guide means rotatably mounted in said bearing, a sectional mold carried by the outer portion of the guide means radially beyond the bearing and having actuating means reciprocable in the guide means in addition to the movement of the guide means as to the bearing for opening the mold, stationary means coacting during carrier movement for rotating the guide means, and a second relatively rotatable carrier having a mold movable therewith to approach said mold on the first carrier, means for closing said last named mold and means actuated by said first named mold opening means for controlling the means for actuating said second mold closing means.

35. Glass blowing apparatus comprising a first rotatable carrier, driving means effecting partial rotation of the carrier, a stationary toothed segment, guide means rotatably mounted on said carrier and provided with a gear disposed to come into engagement with the segment, a mold carried by the outer portion of the guide means radially beyond the gear and having actuating means reciprocable in the guide means in addition to the movement of the guide means with the gear for opening the mold, and a second relatively eccentric rotatable carrier having a mold movable therewith to approach said mold on the first carrier, means for closing said last named mold and means actuated by said first named mold opening means for controlling the means for actuating said second mold closing means.

36. Glass blowing apparatus comprising laterally adjacent relatively eccentric rotatable carriers, driving means effecting partial rotation of the carriers, a stationary toothed segment above one of the carriers, guide means rotatably mounted on one of said carriers and provided with a gear disposed to come into engagement with the segment, a mold carried by the outer portion of the guide means radially beyond the gear and reciprocable actuating means in said guide means for opening the mold, a mold on the other of said carriers, means for closing said last named mold and means actuated by said first mold opening means for controlling the means for actuating said second mold closing means.

37. The combination, in a glass blowing machine, of a rotatable mold carrier, a standard rotatably supporting said carrier, means for moving said carrier, a mold revoluble on a horizontal axis mounted on said carrier, a cylinder, a bearing on said carrier receiving said cylinder, a piston in said cylinder, a piston rod carried thereby and connected to said mold, said piston, rod and cylinder being revoluble with the mold in said bearing, means for supplying said piston with air to open said blank mold, means for revolving said mold on its horizontal axis as the carrier is rotated, a blow mold adapted to be associated with said blank mold, means to close said blow mold, and means for controlling the closing movements of the blow mold by the opening of the blank mold and in timed relation therewith.

38. The combination, in a glass blowing machine, of a rotatable mold carrier, a standard rotatably supporting said carrier, means for moving said carrier, a mold revoluble on a horizontal axis mounted on said carrier, a journal for the mold, a bearing on the carrier receiving said journal, an actuator connected to said mold and extending axially of said journal, fluid pressure operated means for moving said actuator, means for supplying said piston with air to open said blank mold, means for revolving said mold on its horizontal axis as the carrier is rotated, a blow mold adapted to be associated with said blank mold, means to close said blow mold, and means for controlling the closing movements of the blow mold by the opening of the blank mold and in timed relation therewith.

39. In a glass blowing machine, the combination of a plurality of pairs of molds movably mounted, face plates mounted on horizontal axes carrying one of each pair of said molds, means for rotating said face plates to place the molds carried thereby in an inverted charging position and then to place said molds in position to permit opening of the same free of the blanks and closing of the other mold of the pair around said blanks, means for opening one of said molds and closing the other of said molds, and means controlled by the movements of said mold opening means for actuating said other mold closing means, and means for blowing air into the opposite ends of said molds while in inverted position.

40. In a bottle forming machine, the combination with an inverted parison mold having a charge opening at its upper end to receive a charge of molten glass, of laterally and downwardly movable blowing means to apply pressure through said opening for forming the neck of the bottle, a core or plunger to form an initial blow opening in said neck, means for blowing air through said blow opening in sufficient volume and pressure to blow the glass while confined in the parison mold to hollow form of definite length to partially form the bottle in the parison mold, a finishing mold, automatic means for transferring the parison to the finishing mold including means to open the parison mold to expose the parison, neck rings permanently connected with said parison mold but movable relatively thereto for supporting the parison when exposed, means to close the finishing mold around the thus supported parison, and automatic means to release the neck ring whereby the parison may be supported wholly by the finishing mold, and blowing means for blowing the parison to its final form.

41. In a glass working machine, a plurality of blank molds, a substantially horizontally traveling member carrying said molds and movably mounted to bring the same to a plurality of different stations, said member being adapted to present each mold in inverted position at a charging station, means normally laterally removed from the axis of said mold but movable to closed position thereon for supplying fluid pressure to the upper end of a mold at the charging station to compact the glass into the neck end of the mold, closing means at another station for the bottom ends of the molds, means at such other station for supplying fluid pressure to a mold having said closing means in operative relation thereto to form a hollow parison therein, a plurality of blow molds, means for automatically transferring the parison from the parison mold to the blow mold, means beyond the transferring station for finish-blowing the parisons in the blow molds, and means for turning the parison molds neck end upwardly after the glass has been compacted therein and before the finish-blow.

42. In a bottle forming machine, the combination with an open bottom parison mold adapted to receive a charge of molten glass through its bottom end, of means for supporting the parison mold in inverted position while receiving said charge, shear mechanism for said charge, means normally laterally removed from the axis of said mold during the charging thereof but movable to closed position thereon to apply fluid pressure through said bottom end for forming the neck of the bottle, a core or plunger to form an initial blow opening in said neck, means for confining the charge in the parison mold and then blowing air through said blow opening in sufficient volume and pressure to blow the glass in the parison mold to hollow form to partially form the bottle in the parison mold, connections operating said blowing means in timed relation to a movement of the shear mechanism, a finishing mold, and means for automatically transferring the parison to the finishing mold and means beyond the transferring position for blowing the bottle to its final form.

43. In a bottle forming machine, the combination of a parison mold comprising a body blank mold and a neck mold at one end thereof for forming the neck of a bottle, said mold having an open bottom to receive a charge of glass, means for supporting said mold in inverted position while receiving said charge of glass, shear mechanism for said charge, means to form an initial blow opening in the neck of the bottle, a head to form a closure for said charge opening, means for blowing air through said blow opening in sufficient volume and pressure to blow the glass in the body mold to hollow form and partially form the bottle, connections operating said blowing means in timed relation to a movement of the shear mechanism, means to open the body blank mold leaving the bare hollow blank supported by the neck mold, a finishing mold, means for closing the finishing mold and automatic means controlled by the opening of the body blank mold for actuating the finishing mold closing means and neck mold for transferring the blank to the finishing mold.

44. In a bottle forming machine, the combination of a parison mold comprising a body blank mold and a neck mold at the lower end of said blank mold for forming the neck of a bottle, the upper end of said body mold being open to receive the charge of glass, means normally laterally removed from the axis of said mold but movable to closed position thereon to apply pressure through said upper end to compact the glass, means to form an initial blow opening in the neck of the bottle, a head to form a closure for said charge opening, means for blowing air through said blow opening in sufficient volume and pressure to blow the glass in the body mold to hollow form and partially form the bottle while said mold is closed, a finishing mold means for moving said parison and finishing molds in unison, means for automatically transferring the blank to the finishing mold, and means operable beyond the transferring position for blowing the bottle to finished form in the finishing mold.

45. The combination, in a glass working machine, of a series of blank molds adapted to be successively moved to a charging station and a parison blowing station, means for supporting said molds in inverted position at the charging station, fluid actuated means for intermittently moving said molds to said stations, neck pin devices at the charging station below the blank molds, fluid actuated means for moving the neck pin devices with relation to the molds, a blow-down device at the charging station normally laterally removed from the axis of the blank mold, fluid actuated means for moving the blow-down device about a vertical axis into cooperative relation to the blank molds, a parison blowing device at the parison blowing station, fluid actuated means for moving the parison blowing device with relation to the molds, a cover device for the molds at the parison blowing station, fluid actuated means for moving the cover device with relation to the molds, valves for automatically controlling a flow of fluid pressure to and exhaust from all of said fluid actuating means, a shearing device positioned above the molds at the charging station, means for actuating the shearing device, and a valve operable in timed relation to a movement of the shearing device, for shifting the automatic valves to actuate the said devices and mold moving means in timed relation to each other.

46. The combination, in a glass working machine, of a series of blank molds adapted to be successively moved to a charging station and a parison blowing station, means for supporting said molds in inverted position at the charging station, a plurality of blow molds, a bottle blowing station, fluid actuated means for intermittently moving the blow molds to said blowing station, a neck pin device at the charging station below the blank molds, fluid actuated means for moving the neck pin device with relation to the blank molds, a blow-down device at the charging station, fluid actuated means for moving the blow-down device with relation to the blank molds, a parison blowing device at the parison blowing station, fluid actuated means for moving the parison blowing device with relation to the blank molds, cover devices for the blank molds at the parison blowing station, fluid actuated means for moving the cover device with relation to the molds, a bottle blowing device at the bottle blowing station, fluid actuated means for moving the bottle blowing device with relation to the blow molds, a clamping device for the blow molds, fluid actuated means for moving the clamping means with relation to the blow molds, means for automatically transferring the parison from the parison mold to the finishing mold, valves for automatically controlling the flow of fluid pressure to and exhaust from all of said fluid actuated means, a shearing device positioned above the blank molds at the charging station, means for actuating the shearing device, a valve operating in timed relation to a movement of the shearing device for shifting the automatic valves to actuate the blank mold devices, the bottle blowing device, the mold clamping devices, and mold moving means in timed relation to each other, said valves including means for preventing the disengagement of the parison mold cover until the bottle blowing fluid pressure has been released.

47. The combination of a mold carriage, molds thereon open at one end to receive charges of molten glass, means to rotate the carriage step by step to bring the molds to different stations, a blowing head at one station laterally removed from the axis of the mold to permit charging thereof, means for moving said head into engagement with the charge opening of said mold and blowing air under pressure on the charge therein while at the charging station, a closure for said charge opening at a succeeding station, a second blowing head to supply air under pressure at the opposite end of the mold while the charge opening is closed by said closure and effect an initial blowing of the parison to blow the glass in said mold to hollow form and partially form the bottle, finishing molds supported in upright position, means for moving the finishing molds in a path separate from that of the blank molds, automatic means for transferring the parisons to the finishing molds in upright position, and means beyond the transfer position for supplying air under pressure to blow the parisons in the finishing molds.

48. A glass working machine comprising blank molds and blow molds, carrying means for said molds adapted to move the same past a plurality of stations, a mouth forming pin arranged to be moved upwardly into the mouths of the blank molds to close said mouths while the blank molds are at the charging station, and prior to the final descent of glass into the molds, means normally laterally removed from the axis of said mold but movable to closed position thereon at said charging station for forcing the glass into the molds and around said mouth forming pin to partially form the parisons at the charging station, blowing means for finishing the parisons in the blank molds when they are successively brought to another station, means for confining the charge in the parison mold during the parison blowing, there being a transfer station beyond the parison finishing station, connections for opening and closing the respective molds automatically in timed relation for automatically effecting transfer of the parisons at the transfer station from the parison molds to the blow molds and positioning the same in the blow molds and a bottle blowing device for the blow molds beyond the transfer station and means for holding the blow molds tightly closed during the finished blow.

49. In an organized machine for making glass containers, shear mechanism arranged to sever glass above the level of an inverted parison mold, a plurality of pairs of molds, the molds of each pair being rotatable about laterally spaced axes, each pair comprising a parison mold and a blow mold, said parison molds providing spaced inverted cavities for the sheared mold charges, members carrying said molds and rotatably mounted to bring said molds to a plurality of different stations, neck molds pivotally mounted on the parison mold support and associated with said parison mold during the forming of the parison therein, means normally laterally removed from the axis of said mold but movable to closed position thereon for subjecting the upper end of the charge of glass in each of the parison molds to air pressure to compact the glass, mouth forming pin mechanism arranged to close the mouth ends of the parison cavities when the glass charges are packed therein whereby the mouth of the container is formed around said mouth forming pin mechanism, means for moving said members to bring a charged mold to another station, means for subjecting the opposite end of the charge of glass in each of said parison molds to fluid pressure of sufficient volume and pressure to blow the packed charge into a parison in the parison mold, means for closing the bottom ends of the parison molds so that the glass charges are confined during the parison blow, means for automatically transferring the parisons to the blow molds, and means for finishing the articles in the blow molds.

50. In a glass working machine, a plurality of parison molds, a plurality of blow molds, shear mechanism arranged to sever glass above the level of an inverted parison mold, said parison molds providing spaced cavities and being adapted to be maintained in inverted position during the charging of glass into the same, mouth forming pin mechanism arranged to close the mouth ends of the parison cavities when glass charges are packed therein, means for effecting a packing of the glass around said mouth forming pin mechanism, means for subsequently blowing the packed charges to hollow form, means for confining the charges during the blowing to hollow form, connections arranged to bring the parison molds and the shear mechanism into cooperative relation for charging the parison molds in the desired order, fluid pressure means adapted to open the parison molds to permit transfer of the blown parisons, a fluid pressure cylinder adapted to close the blow molds, means controlled by the opening of the parison molds and operable thereafter for operating said blow mold closing cylinders, means for inverting the parisons to neck end up position before transfer, and means for finish blowing the parisons in the blow molds.

51. In an organized machine for making glass containers, shear mechanism arranged to sever glass above the level of an inverted mold, a series of parison molds providing spaced inverted cavities for the sheared mold charges, separate neck molds, independent operating connections for the parison molds and neck molds for effecting opening and closing movements thereof, mouth forming pin mechanism arranged to close the mouth ends of the parison cavities when the glass charges are packed therein, means for establishing a fluid pressure differential in the opposite ends of a charged parison mold to pack the charge therein and form the mouth of the container around the mouth forming pin, means operable thereafter for applying fluid pressure of sufficient volume and pressure to blow the packed charge into a parison in the parison mold, means for closing the bottom ends of the parison molds so that the glass charges are confined during the parison blow, connections automatically controlled by the machine arranged to bring the shear mechanism and the parison molds into cooperative charging relation, connections arranged for establishing said fluid pressure differential in each parison mold and for thereafter applying said fluid pressure to blow the packed charge into a parison in each parison mold in predetermined time relation to each other and to the shearing movement of the shear mechanism for the charge therein and for controlling the duration of same in advance of and in timed relation to the releasing of said mouth forming pin and parison mold closing means, connections arranged to automatically invert the parisons, a series of finishing molds adapted to receive the inverted parisons from the parison molds, means for transferring the parisons to the finishing molds, and means beyond the transferring position for blowing the parisons to final form in the finishing molds.

52. In an organized machine for making glass containers, shear mechanism arranged to shear glass in a predetermined plane above the level of an inverted parison mold, a series of parison molds providing spaced inverted cavities for the sheared mold charges, a movable support for said molds, connections for opening and closing said parison molds in predetermined timed relation to a movement of the shear mechanism, separate neck molds each adapted to cooperate successively with a parison mold and a finishing mold, means movably secured to said parison mold support for supporting each neck mold below and in cooperative relation with a parison mold being charged and for supporting each parison by the neck mold after the parison mold is opened and before engagement by a finishing mold, mouth forming pin mechanism arranged to close the mouth ends of the neck molds and limit the downward flow as the glass charges descend therein, connections operative in predetermined timed relation to the movement of the shear mechanism for said charge and throughout a predetermined time interval for establishing a fluid pressure differential in the opposite ends of a charged parison mold to pack said charge therein, connections for withdrawing the mouth pin forming mechanism from the mouth ends of the neck molds in predetermined timed relation to a shear movement and packing, connections operative thereafter and in predetermined timed relation to a shear movement, packing and withdrawal of the mouth pin mechanism to apply fluid pressure to blow the packed charge into a parison in the parison mold, means arranged to confine the bottom ends of the glass charges during the parison blow, connections arranged for terminating the application of fluid pressure differential and the parison blow, prior to the withdrawing of the mouth forming pin and parison confining means, respectively, connections arranged to bring the shear mechanism and parison mold into cooperative relation in said predetermined order, connections arranged to automatically invert the neck molds and to bring the parisons into upright position for reception by the finishing molds, a series of finishing molds adapted to receive the inverted parisons from the parison molds, means for opening the parison molds, means for closing the finishing molds around the parison supported by the neck molds, and means for disengaging the neck molds from the parison prior to blowing the parison in the finishing mold to transfer the parison from the parison mold to the finishing mold, and blow head means for blowing the parisons to final form in the finishing molds.

53. On an organized machine for making glass containers, a circular series of parison molds adapted to be inverted, a rotary carrier supporting said series of parison molds, shear mechanism arranged to sever successive charges of glass in a predetermined plane above the level of said parison molds while inverted, connections for opening and closing said parison molds in predetermined time relation to a shear movement, a circular series of upright finishing molds arranged to receive the parison from the parison molds, separate neck molds one for each parison mold pivotally mounted upon the parison mold carrier and adapted to cooperate successively with a parison mold and a finishing mold, supports cooperating with the rotary carrier adapted to support each neck mold below and in cooperative relation with a parison mold at the shearing station and to support each neck mold and its parison after opening of its parison mold and before engagement of the parison by a finishing mold, mouth forming pin mechanism arranged to project into the neck molds and close the mouth ends thereof and limit the downward flow as the glass charges descend therein, blow head mechanism arranged to engage the upper end of an inverted parison mold to pack the charge therein and form the mouth of the container around the mouth forming pin, connections arranged to apply and remove said blow head mechanism in timed relation to the movement of the shear mechanism for the charge, movable closure means for the bottom ends of the parison molds to confine the glass charges during the parison blow, connections arranged to rotate the carrier to bring the successive parison molds into cooperative relation to the shear mechanism in a predetermined order, connections for withdrawing the mouth forming pin mechanism from the mouth ends of the neck molds in timed relation to the shear movement, and blow head mechanism for applying parison blowing pressure to the mouth ends of the parison molds in timed relation to the shear movement, confining of the charge, packing the glass and withdrawal of the mouth forming pin mechanism, connections arranged to release the parison blow head pressure before the withdrawal of the movable closure means therefrom, automatic means arranged to invert the neck molds and bring the parisons supported thereby into upright position for delivery to the finishing molds, a rotary carrier for said finishing molds laterally spaced from said blank mold carrier, means for opening and connections for closing the finishing molds automatically, means for holding said finishing molds closed after transfer and during final blowing, and blow head mechanism for blowing the parisons to final form in the finishing molds beyond the transfer station.

54. In an organized machine for making hollow glass containers, shear mechanism arranged to sever glass above the level of an inverted mold, a series of parison molds providing spaced apart inverted cavities for sheared mold charges, a rotary carrier supporting said series of parison molds, separate neck molds for each parison mold pivotally mounted upon said carrier, mouth forming pin mechanism arranged to close the mouth ends of the parison cavities when the glass charges are packed therein, means for applying differential fluid pressure to one end of a charged parison mold to pack the charge therein, and form the mouth of the container around the mouth forming pin, means for thereafter applying fluid pressure of sufficient volume and amount to blow the packed charge into a parison in the parison mold, means for closing the bottom ends of the parison molds so that the glass charges are confined during the parison blow, connections arranged to move the parison molds and bring them into cooperative charging relation to the shear mechanism in said predetermined order, connections arranged for applying the fluid pressure differential and the fluid pressure parison blow in predetermined time relation to each other and control the duration thereof by a movement of the parison mold moving means, connections arranged to automatically invert the parisons, a series of finishing molds mounted upon a second rotary carrier and adapted to receive the upright parisons from the parison molds, means for automatically transferring the parison from the parison mold directly to the finishing molds, and means for blowing the parisons to final form in the finishing molds at a station beyond the transfer station.

55. A glass blowing machine comprising a station for receiving a severed charge of glass, an invertible blank mold having its open bottom uppermost at said glass receiving station, a neck pin below said blank mold at said station adapted to close the open neck of the mold, a blow head movably mounted above said blank mold at said station, automatic means for raising and lowering said blow head including a piston and rod, said blow head having an arm and roller engaging a fixed guide for swinging said blow head away from said blank mold as it is raised, and vice versa, and means for operating said piston to lower said blow head after a charge of glass is severed and dropped into said mold.

56. A glass blowing machine comprising a station for receiving a severed charge of glass, an invertible blank mold having its open bottom uppermost at said glass receiving station, a neck pin below said blank mold at said station adapted to close the open neck of the mold, a blow head movably mounted above said blank mold at said station, said neck pin and blow head being relatively adjustable to cooperate with blank molds of different lengths, automatic means for raising and lowering said blow head including a piston and rod, said blow head having an arm and roller engaging a fixed guide for swinging said blow head away from said blank mold as it is raised, and vice versa, and means for operating said piston to lower said blow head after a charge of glass is severed and dropped into said mold.

57. A laterally swinging and vertically moving blow head unit for glass blowing machines comprising a support adjustable vertically upon the base of a glass blowing machine, an operating cylinder carried by said support and means for operating said blow head therefrom, a curved guide carried by said support, said blow head having an arm cooperating with said guide for positioning the blow head over the mold in its lowered position and away from the mold in its raised position.

58. In a glass blowing machine, the combination with a blank table and a blank mold carried thereby, means for opening the blank mold on arriving at a predetermined position, means for suspending the blank when released from the blank mold at said position, means for positioning the blow mold about the suspended blank at said position, and means for releasing the blank from its supporting means just prior to the closing of the blow mold, whereby the blank is positioned in the blow mold with its mouth exposed ready for blowing to finished form.

59. In a glass blowing machine, a blank mold movable successively to separate stations, a blow mold movable successively to separate stations, one of said stations of the blank mold being identical with one of the stations of the blow mold, a neck mold associated with the blank mold for engaging the neck portion of the blank and automatic means for successively opening the blank mold, closing the blow mold and releasing the neck mold during closing of the blow mold and in the order named at said identical station to transfer a blank from the blank mold to the blow mold, whereby the blank is positioned in the blow mold with its mouth exposed ready for blowing to finished form.

60. The combination with a blank mold movable successively to separate stations, and a blow mold movable successively to separate stations, one of the stations of the blank mold being identical with one of the stations of the blow mold, and supporting means for engaging the neck portion of the blank, of means operating automatically for successively opening the blank mold, closing the blow mold about the blank, and releasing the blank from its supporting means prior to the closing of the blow mold and, whereby the blank is positioned in the blow mold with its mouth exposed ready for blowing to finished form.

61. In a glass blowing machine, a blank mold movable successively to separate stations, a neck ring movable with said blank mold, a blow mold movable successively to separate stations, one of the stations of the blow mold being identical with one of the stations of the blank mold, and means operating successively for releasing the blank from the blank mold, positioning the blow mold about the released blank, and disengaging the blank from the neck ring, whereby the blank is positioned in the closed blow mold with its mouth exposed ready for blowing to finished form, means for blowing the blank to final form in the blow mold following the disengagement of the blank from the neck ring, and means for adjustably timing the neck ring releasing with relation to the blow mold closing.

62. In a glassware forming machine, the combination of blank molds and blow molds mounted for uniform synchronous movement and successively movable toward and from a transfer position, neck rings associated with said blank molds during the forming of the blanks and adapted for supporting the blanks at the transfer position, mechanism for automatically freeing the blanks from the blank molds whereby to expose successive blanks suspended in the neck rings at the transfer position, mechanism for automatically closing the blow molds around the thus suspended blank, mechanism for automatically opening the neck rings to release the blank as the blow molds close around it, and means for timing said mechanism to operate successively in the order named, and means for blowing the bottle to finished form in the blowing mold after it has been released by the neck rings and at a position beyond the transfer position.

63. In a glassware forming machine, the combination of blank molds and blow molds mounted for synchronized uniform movement successively toward and from a transfer position, neck rings associated with said blank molds during the forming of the blanks and adapted for supporting the blanks during transfer, mechanism for automatically disengaging the blank molds from the blanks whereby to suspend successive blanks in the neck rings, mechanism for automatically closing the blow molds around the thus suspended blank, mechanism for automatically opening the neck rings to release the blank, means for moving said molds in synchronism, and means controlled by said mold moving means for timing said mechanism to operate successively in the order named, and means for blowing the bottle to finished form in the blow mold after it has been released by the neck rings and at a position beyond the transfer position.

64. In an automatic glassware forming machine, the combination of separable blank and blow molds movable as a whole in different laterally spaced paths intersecting at a common operative position, means for moving said molds uniformly and synchronously, separable neck rings associated with said blank molds in the blank forming position, automatically operable blank fabricating devices for cooperation with said blank molds, for first blowing air into the blank mold to compact the charge therein and later to admit air through the neck portion to blow the blank to hollow form and predetermined length, a closure for the bottom of the blank mold for confining the charge therein during the blowing to hollow form, means for opening the blank molds to disengage them from the blanks, thereby to expose successive blanks held in the neck rings at said common operative position, means to close the blow molds successively around the thus supported blanks, and means to disengage the neck rings therefrom, all of said means and devices being operable automatically and controlled by the means for moving the molds.

65. In an automatic glassware forming machine, the combination of separable blank and blow molds movable as a whole in different laterally spaced paths intersecting at a common operative position, means for moving said molds uniformly and synchronously to successive operating positions, separable neck rings associated with said blank molds in the blank forming position, means for positioning a blank mold and associated neck mold with the neck down during the formation of the blank, automatically operable blank fabricating devices for cooperation with said blank molds, including means for compacting the glass in the blank mold and later blowing it to hollow form therein, means for closing the bottom end of the blank mold so as to confine the charge therein during the blowing to hollow form, means to invert the blank mold, means to disengage the blank mold from the blank and thereby support the blank from the neck rings, means to position and close a blow mold around the thus suspended blank thereby to transfer the blank from the blank mold to the blow mold, means to open the neck molds thereby to support the blank wholly by the blow mold, all of said means and devices being operable automatically and controlled by the movements of the mold moving means.

66. In an automatic glassware forming machine, the combination of a rotatable mold carrier having blank molds thereon and neck rings associated therewith, means for positioning a blank mold and neck ring with the neck ring downmost to receive a charge of glass and while in such position initially form the blank, automatically operable blank fabricating devices for cooperation with said blank molds, for first blowing air into the blank mold to compact the charge therein and later to admit air through the neck portion to blow the blank to hollow form and predetermined length, a closure for the bottom of the blank mold for confining the charge therein during the blowing to hollow form, means to invert the blank mold and neck ring to present the neck ring uppermost, means to disengage the blank mold from the blank whereby to support the blank from the neck ring, a separable blow mold, means to close said blow mold around said suspended blank, means for opening said neck ring to disengage the blank as the blow molds close around it and means for moving said blow mold to a blowing position where the article is blown to finished size, all of said means and devices being coordinated with the mold moving means to operate in the order named.

67. In an automatic glassware forming machine, the combination of a rotatable mold carrier having blank molds and neck molds thereon, means for intermittently moving said carrier to present said blank molds to successive operating stations, including charging, blank forming and transfer stations, separable blow molds movable intermittently to separate stations including transfer, blowing and discharge stations, means for positioning the blank and neck molds with the neck mold lowermost at the charging station to receive a charge of glass, blow head means normally removed from the axis of said mold but movable to closed position thereon for blowing air into the top of the mold while at said station to form the neck and mouth finish of the article, means to admit a sufficient amount of air to the blank at the blank forming station thereby to elongate it, a closure member for the bottom end of the blank mold for confining the charge during the last named blowing operation, means to invert the blank and neck molds during movement thereof from the charging station to the transfer station, means successively operable while the blank is at the transfer station to disengage the blank mold therefrom, thereby to suspend the blank from the neck mold, means to position and close a blow mold around the suspended blank, means to open the neck mold whereby the blank will be supported wholly by the blow mold, means for blowing the article to finished form at the blowing station, and means for opening said blow molds at said discharge station, all of said means being operable automatically and coordinated with said mold moving means to operate in the order named.

68. In an automatic glassware forming machine, the combination of separable blank and blow molds movable as a whole in different paths intersecting at a common operating position, means for moving said molds uniformly and simultaneously to successive operating positions, separable neck rings associated with said blank molds in the blank forming positions, means for admitting air under pressure into opposite ends of the blank mold, at different times, first to compact the charge of glass therein and later to blow it to hollow form, a closure means for confining the charge in the blank mold during the blowing to hollow form, means for opening the blank mold thereby to support the blank by the neck rings at said common position, means to close the blow mold around the suspended blank, said last named means being controlled by and operable only after the completion of the blank mold opening means, and means to disengage the neck ring from the blank enclosed by the blow molds, said means being operable automatically in the order named and controlled by the means for moving the mold carriers.

69. In an automatic glassware forming machine, the combination of a rotatable mold carrier having invertible blank molds thereon and neck rings associated therewith, means for positioning a blank mold and neck ring with the neck ring lowermost to receive a charge of glass, a laterally swinging blow head adapted for cooperation with said blank mold, means operable in predetermined timed relation to the charging of the glass into the mold for controlling the supply of air under pressure through said blow head to compact the charge in said mold, means operable thereafter and in predetermined timed relation thereto for blowing the parison to hollow form in the blank mold, means for closing the bottom end of the blank mold to confine the charge therein during the last named blowing operation, means to invert the blank mold to present the neck of the blank uppermost, means to disengage the blank mold from the blank thereby to permit it to be supported from the neck rings, a separable blow mold, means to close said blow mold around said blank and disengage the neck rings therefrom, and means for moving said blow mold in a path laterally spaced from the path of the blank mold to a blowing position where the article is blown to finished shape, all of said means being coordinated with the mold moving means to operate in the order named.

70. In a bottle forming machine, the combination of a parison mold comprising a body blank mold and a neck mold at the lower end of said blank mold for forming the neck of a bottle, the upper end of said body mold being open to receive the charge of glass, shearing mechanism for the glass above the level of the parison mold, a blow head operable in predetermined timed relation to the shearing movement of the shearing means to apply air pressure through the upper end of the blank mold to compact the glass charge therein, means to form an initial blow opening in the neck of the bottle, a head to form a closure for said charge opening, means for blowing air through said blow opening in sufficient volume and pressure to blow the glass in the body mold to hollow form and partially form the bottle, means to open the body blank mold, leaving the bare hollow blank supported by the neck mold, a finishing mold, means for blowing the bottle to final form therein, means for closing the finishing mold around the blank supported by the neck mold, and automatic means to operate the neck mold after the blank mold is opened and during closing of the finishing mold for transferring the blank to the finishing mold before the final blowing.

71. In a bottle forming machine, the combination of a parison mold comprising a body blank mold and a neck mold at the lower end of said blank mold for forming the neck of a bottle, the upper end of said body mold being open to receive the charge of glass, a shear mechanism above the blank mold, a blow head operable in predetermined timed relation to the shearing movement of the glass to apply air pressure through the upper end of the blank mold to compact the glass charge therein, means to form an initial blow opening in the neck of the bottle, a head to form a closure for said charge opening, means for blowing air through said blow opening in sufficient volume and pressure to blow the glass in the body mold to hollow form and partially form the bottle, means to then open the body blank mold, leaving the bare hollow blank supported by the neck mold, a finishing mold, means for closing the finishing mold around the blank supported by the neck mold, and automatic means to open said neck mold, during the closing movement of the finishing mold.

72. In a bottle forming machine, the combination with a divided parison mold having a neck opening and a charge opening to receive a charge of molten glass, a neck mold permanently associated with said parison mold, for movement therewith, of means to apply pressure through said charge opening to the adjacent end of a glass charge for compacting the charge and for forming the neck of the bottle, a core or plunger arranged in said neck opening to form an initial blow opening in said neck, means for withdrawing said plunger and blowing air through said blow opening in sufficient volume and pressure to blow the glass in the parison mold to hollow form to partially form the bottle in the parison mold, a finishing mold, means for automatically and successively opening the blank mold, closing the finishing mold and opening the neck mold for transferring the partially blown parison to the finishing mold, means for blowing said parison to finished form at a position beyond said transfer position, a rotatable carrier for said molds, means for moving said carrier, and means controlled by said carrier moving means for terminating the operation of said blowing means.

73. In a bottle forming machine, the combination with an inverted parison mold having a neck opening and a charge opening at its upper end to receive a charge of molten glass, a movable support for said molds, of laterally swinging blow head means to supply pressure through said charge opening for forming the neck of the bottle, a core or plunger entering the neck opening from below to form an initial blow opening in said neck, means for confining the charge in the parison mold means for withdrawing said plunger and blowing air upwardly through said blow opening in sufficient volume and pressure to blow the glass in the parison mold to hollow form to partially form the bottle in the parison mold, a finishing mold, means movably mounted upon the parison mold support for automatically inverting and transferring the parison to the finishing mold, said last mentioned means including means for automatically closing said finishing mold immediately upon the parison being presented in transfer position, means beyond the transferring position for blowing the article to final form in the blow mold, means for holding said blow mold closed during movement of the carrier following transfer and during final blowing, a rotatable carrier for said molds, means for moving said carrier, and means controlled by said carrier moving means for terminating the final blowing.

74. In a glass blowing machine, a plurality of pairs of molds, each pair comprising a divided blank mold and a divided blow mold, neck rings permanently associated with said blank molds, means for charging the blank mold of each pair, means for subjecting the upper end of the charge of glass in each of said blank molds to air pressure to compact the glass, means for subjecting the opposite end of the charge of glass in each of said blank molds to air pressure to partially form the same, automatically operable means for effecting inversion and transfer of the partially formed blank from the blank mold to the desired blow mold, comprising means for automatically and successively opening the blank mold, closing the blow mold and opening said neck rings, means for finishing the articles in the blow molds, mold clamping means for the blank molds and blow molds, and means for automatically applying and releasing said mold clamping means in timed relation to the corresponding blowing operation upon the article therein.

75. In an organized machine for making glass containers, shear mechanism arranged to sever a charge of glass above the level of the parison molds, a series of inverted parison molds providing receptacles for the sheared mold charges, connections arranged to bring the shear mechanism and the parison molds into cooperative charging relation, neck ring molds for said parison molds, mouth forming pin mechanism arranged to close the mouth ends of the parison cavities when the glass charges are packed therein, means for blowing air into the top of the parison mold to pack the charge therein and form the mouth of the container around the mouth forming pin and for thereafter applying fluid pressure of sufficient volume and pressure to blow the packed charge into a parison in the parison mold, connections arranged for establishing said fluid pressure differential in each parison mold and for thereafter applying said fluid pressure to blow the packed charge into a parison in each parison mold in predetermined timed relation to each other and to the movement of the shear mechanism for the charge therein, means for closing the bottom ends of the parison molds so that the glass charges are confined during the parison blow, connections arranged to automatically turn the parisons neck end up, fluid pressure means for opening the parison molds and neck ring molds, a series of finishing molds adapted to receive the neck end up parisons from the parison molds and neck ring molds, means automatically operable in timed relation to the opening of the parison molds for closing the finishing molds prior to the opening of the neck rings, further means synchronized with said blow mold closing means for opening the neck rings free from the parison before the finishing molds are completely closed, a stationarily positioned clamping cylinder coacting with said finishing molds for holding them closed, means for blowing the parisons to final form in the finishing molds, and means for controlling the duration of blowing in synchronism with the release of the clamping cylinders from the molds.

76. In a glass blowing machine, the combination with blank molds movable successively to separate stations, including charging, parison forming and transfer stations, and a neck ring cooperating with each blank mold, of blow molds movable successively to separate stations, one of the stations of the blow molds being identical with one of the stations of the blank molds, and means controlled by the placing of a gather in one of the blank molds for the successive operation of another blank mold at the parison blowing station to move it to the identical station and then to release the blank from the blank mold, position the blow mold around the blank, and release the blank from the neck ring in succession.

77. In a glass blowing machine a sectional blank mold movable successively to separate stations including a transfer station, a sectional blow mold movable relatively to said blank mold and to separate stations successively including said transfer station, both molds being movable horizontally and on the same level to and from said transfer station, means for opening the blank mold upon approaching the transfer station, means for suspending the blank when released by said blank mold, means operable following the opening of said blank mold for closing the blow mold around the blank at said transfer station, and means for releasing said supporting means from said blank as the blow molds are closed around it to transfer the blank from the blank mold to the blow mold.

78. In a glassware machine, a plurality of blank and blow molds, two laterally separated rotatable carriers for moving the molds in converging paths, a transfer station common to both paths, means for automatically transferring ware from one path directly to the other including pneumatic means operable in one direction to effect release of the ware from its initial path, means to move said carriers, and means operated by movement of said carriers to operate said pneumatic means in the opposite direction.

79. In a glassware machine, a movable blank mold carrier having blank molds thereon movable in a cyclical path, a movable blow mold carrier having blow molds thereon movable in a different non-axial cyclical path, a common station for said blank and blow molds, neck rings adapted to be associated with the blank molds during forming of the blank and mounted for cooperation with the respective molds at said station, means for moving said carriers in unison, automatically operated mechanisms for cooperatively associating the neck rings and the blank molds during the forming of the blank, means for automatically disengaging the blank mold from the blank while permitting the blank to be supported by the neck rings, means for automatically closing the blow molds around the suspended blank and means for automatically disengaging the neck ring from the blank to effect complete transfer of the blank from the blank mold to the blow mold, means for variably controlling and timing the opening of the neck rings in relation to the closing of the blow molds in accordance with the type of ware being produced, means beyond the transfer station for blowing the bottle to final form in the blow mold, and means for synchronizing said automatically operating mechanisms with the movement of said carriers.

80. In a glassware machine, a movable blank mold carrier having blank molds thereon movable through successive operating positions, a non-axial movable blow mold carrier having blow molds thereon movable through successive operating positions, said mold carriers being intermittently movable in unison in separate paths intersecting at a common position, neck rings adapted to be associated with said blank molds during the forming of the blank therein for cooperation with the respective molds at a position common to said blank and blow molds, means for intermittently moving said carriers in unison, means for automatically disengaging the blank molds from the blank while permitting the latter to be supported by the neck rings, and cooperating mechanism for automatically closing the blow molds around the suspended blank, means for automatically opening the neck rings, said mechanism being automatically controlled by means correlated with the movement of said carriers.

81. In a glass blowing machine a circular series of blank molds and a circular series of blow molds, rotatable carriers supporting said molds and movable in synchronism to bring said molds to and from transferring position, neck rings pivotally mounted on said blank mold carrier and cooperating with said blank molds to form the neck end of the blank and support it during transfer, means to open the blank molds to expose the parison supported by the neck rings, means to close the blow molds around the thus supported parison, and means for automatically operating said neck molds to complete transfer of the parison from the blank molds to the blow molds, said series of blank molds being adapted to successively receive charges of glass, means for shearing such charges, a closure for the blank mold normally laterally removed from the axis of said blank mold but movable to closed position with reference thereto following the charging of the blank mold, connections for moving the closure with reference to the blank mold in predetermined timed relation to the shear movement without intervention of the operator, and means operable thereafter and in predetermined timed relation thereto for causing air in sufficient volume and amount to recess the charge of glass in the blank mold to blow the same to substantially hollow form while confined therein.

82. In a glass blowing machine a circular series of blank molds and a circular series of blow molds movably mounted for rotation in laterally spaced paths, means for moving said molds, face plates mounted on horizontal axes each carrying one of the blank molds, means rotatably mounting said face plates to place the molds carried thereby in an inverted charging position and in an upright transferring position adjacent the series of blow molds to permit transfer of the blanks from the path of the blank mold to the path of the blow mold, means for blowing air into said molds, first to compact the glass therein and then to expand it to hollow form while confined in the blank mold to partially form the blank, means for controlling the duration of said blowing means by a movement of said mold moving means, means embracing the neck of the ware for supporting the blank during mold changing, means for opening the blank molds and closing the blow molds and means for releasing the blank supporting means and means removed from the transfer position and cooperating with the blow molds for blowing the bottle to final form therein.

83. In a glassware forming machine, a circular series of blank molds, a rotatable support therefor, a circular series of blow molds, a rotatable support therefor, means for moving said molds in unison to synchronously approach a transferring position, neck molds permanently associated with said blank molds but movable relatively thereto, means for opening said blank molds to expose the glass parisons supported by the neck molds, means for closing the blow molds around the thus supported parisons, means for releasing the neck molds during closing movements of the blow molds for transferring the parison from the blank mold to the blow mold for movement therewith and subsequent final blowing therein, and means beyond the transfer position for blowing the article in the blow mold to its final form.

84. In a glassware forming machine, a circular series of blank molds, a rotatable support therefor, a circular series of blow molds, a rotatable support therefor, laterally spaced from said blank mold support, means for moving said molds in unison to synchronously approach a transferring position, neck molds permanently associated with said blank molds but movable relatively thereto, means for opening said blank molds to expose the glass parisons supported by the neck molds, means for closing the blow molds around the thus supported parisons, means for releasing the neck molds during closing movements of the blow molds for transferring the parison from the blank mold to the blow mold for movement therewith and subsequent final blowing therein, and means beyond the transfer position for blowing the article in the blow mold to its final form.

85. In a glassware forming machine, a circular series of blank molds, a rotatable support therefor, a circular series of blow molds, a rotatable support therefor, means for moving said molds in unison to synchronously approach a transferring position, neck molds permanently associated with said blank molds but movable relatively thereto, means for opening said blank molds to expose the glass parisons supported by the neck molds, fluid pressure operated means for closing the blow molds around the thus supported parisons, fluid pressure operated means for releasing the neck molds during closing movements of the blow molds for transferring the parison from the blank mold to the blow mold for movement therewith and subsequent final blowing therein, means beyond the transfer position for blowing the article in the blow mold to its final form.

86. A glassware forming machine as defined by claim 85 characterized by the mold supports being intermittently rotated, and the fluid pressure means being operated to close the blow molds and release the neck molds while the molds remain stationary.

87. A glassware forming machine as defined by claim 85 characterized by the mold supports being intermittently rotated, and the fluid pressure means being actuated respectively in blow mold closing direction and neck mold opening direction during stationary periods of mold movement, and means for resetting said fluid pressure means upon succeeding rotative movements of said molds.

88. In a glassware machine comprising blank and blow mold supporting means rotatable in unison, divided molds carried thereby, divided neck rings associated with the blank molds and carried by its supporting means for opening independently thereof, the molds carried by the other of said mold supporting means being located below the lower edge of said neck rings, said last mentioned molds and neck rings being movable to a registering position on a common axis, actuating means for closing and opening said last mentioned molds and neck rings relatively in synchronism, operating means respectively connected to said last mentioned molds and neck rings for engagement with said actuating means for operation thereof as said molds and neck rings are brought into transferring registry, said operating means including adjustable connections whereby the opening of the neck mold in timed relation to the closing of the blow mold may be varied in accordance with the type of ware being produced.

89. Glassware forming apparatus comprising a rotary carrier having a gear, a rotary mounting on the carrier and extending at an angle to the axis of the carrier, a mold carried by the mounting, a plurality of stop station devices, a second gear in mesh with the carrier gear, and power control mechanism for the gears including a piston and cylinder device during one portion of its movement actuating the carrier and the mold mounting relatively to the carrier in effecting two movements of the mold, and during another portion of its movement effecting operation of the station devices including an additional movement of the mold.

90. Glassware forming apparatus comprising a rotary carrier having a gear, a rotary mounting on the carrier and extending at an angle to the axis of the carrier, a mold carried by the mounting, a plurality of stop station devices, a second gear in mesh with the carrier gear, and power control mechanism for the gears including a piston and cylinder device during one direction of its movement actuating the carrier and the mold mounting relatively to the carrier in effecting two movements of the mold, and during the latter portion of said movement effecting operation of the station devices including an additional movement of the mold.

91. An organized machine for making hollow glass containers comprising a sectional open bottom blank mold, means for supplying charges of molten glass through the open bottom end of said mold while in inverted position, a neck mold associated with the neck end of said blank mold, independent operating connections for automatically opening and closing said blank and neck molds, mouth forming pin mechanism arranged to close the mouth ends of said blank and neck molds as the glass charges are delivered thereto, means for applying a fluid pressure differential on opposite ends of the charge in the blank mold to compact the charge in the mold to form the neck finish of the container and an initial blow opening in the end of the blank, means for withdrawing said mouth pin from the neck molds and thereafter applying fluid pressure to the mouth end of the blank to blow the blank to hollow form in the blank mold, a closure for the opposite end of the mold during the blowing of the blank to hollow form, a sectional finishing mold, means to invert the parison after the compacting thereof, automatic means for opening the blank mold leaving the bare hollow blank supported by the neck molds, automatic means to close the finishing mold around the blank supported by the neck mold, automatic means to operate the neck molds to disengage them from the blank as the finishing mold closes around it, and means operative after the disengagement of the neck molds from the blank for engaging the mouth end thereof and blowing it to final form in the finishing mold.

JAMES W. LYNCH.
EDWARD G. BRIDGES.

CERTIFICATE OF CORRECTION.

Patent No. 1,788,312. Granted January 6, 1931, to

JAMES W. LYNCH ET AL.

It is hereby certified that error appears in the above numbered patent requiring correction as follows: Page 1, line 27, for the misspelled word "modily" read bodily; page 6, line 40, for "oulets" read outlets; page 19, line 88, claim 31, for "molds" read mold; page 24, line 11, claim 53, for the first word "On" read In.

In the drawings, Sheet 15, Fig. 27, as shown below should appear as part of the patent;

Jan. 6, 1931. 1,788,312
J. W. LYNCH ET AL
GLASS BLOWING MACHINE
Filed June 4, 1917     15 Sheets—Sheet 15

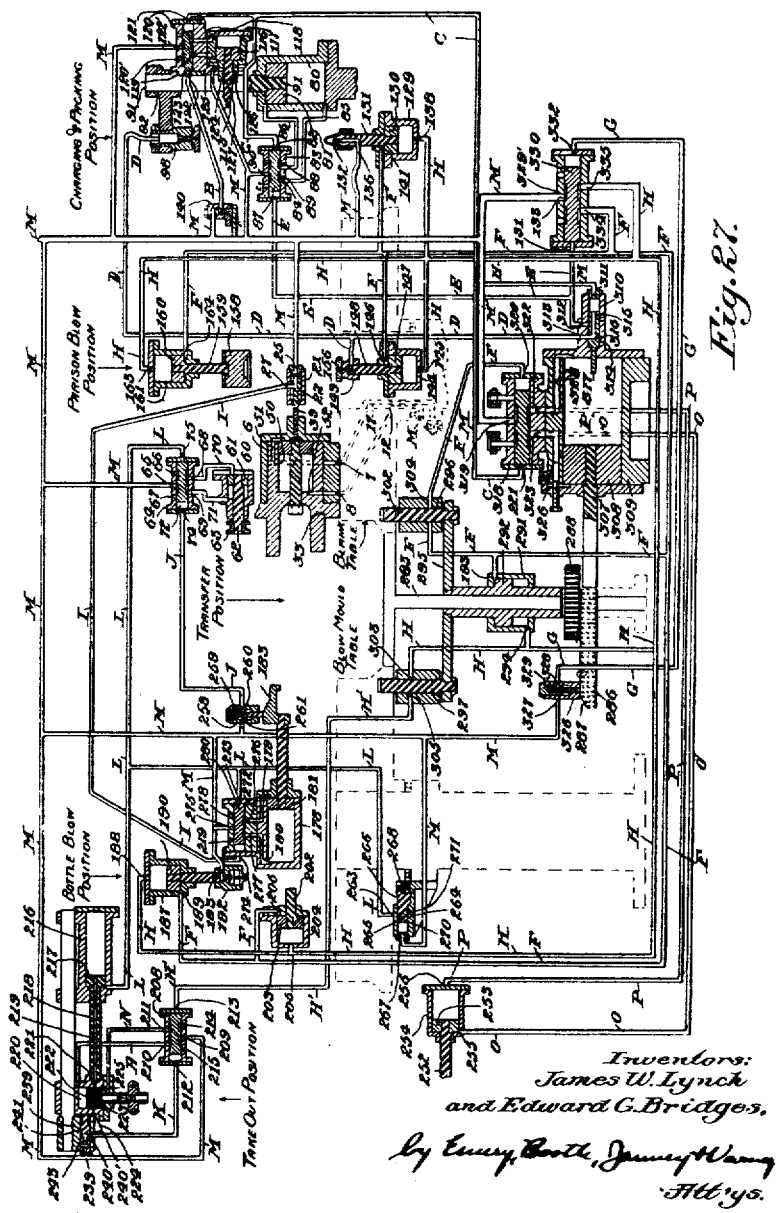

and that the said Letters Patent should be read with these corrections therein that the same may conform to the record of the case in the Patent Office.

Signed and sealed this 3rd day of February, A. D. 1931.

M. J. Moore,
(Seal)     Acting Commissioner of Patents.